(12) United States Patent
Kudo et al.

(10) Patent No.: US 8,984,235 B2
(45) Date of Patent: Mar. 17, 2015

(54) STORAGE APPARATUS AND CONTROL METHOD FOR STORAGE APPARATUS

(71) Applicant: Hitachi, Ltd., Tokyo (JP)

(72) Inventors: Shintaro Kudo, Yokohama (JP); Yusuke Nonaka, Sagamihara (JP); Masanori Takada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/701,656

(22) PCT Filed: Nov. 14, 2012

(86) PCT No.: PCT/JP2012/007303
§ 371 (c)(1),
(2) Date: Dec. 3, 2012

(87) PCT Pub. No.: WO2014/076735
PCT Pub. Date: May 22, 2014

(65) Prior Publication Data
US 2014/0281244 A1     Sep. 18, 2014

(51) Int. Cl.
*G06F 12/10* (2006.01)
*G06F 3/06* (2006.01)
*G06F 12/08* (2006.01)

(52) U.S. Cl.
CPC .......... *G06F 3/0626* (2013.01); *G06F 12/0868* (2013.01); *G06F 12/0871* (2013.01); *G06F 3/0659* (2013.01); *G06F 3/067* (2013.01); *G06F 12/0813* (2013.01); *G06F 2212/222* (2013.01); *G06F 2212/282* (2013.01); *G06F 2212/461* (2013.01); *G06F 2212/463* (2013.01)
USPC ........................................................ 711/147

(58) Field of Classification Search
None
See application file for complete search history.

(56) References Cited

U.S. PATENT DOCUMENTS

2005/0172043 A1     8/2005   Nonaka et al.

*Primary Examiner* — Duc Doan
(74) *Attorney, Agent, or Firm* — Volpe and Koenig, P.C.

(57) ABSTRACT

An exemplary storage apparatus of the invention includes storage devices for storing data of block I/O commands and file I/O commands and a controller including a block cache area and a file cache area. The controller creates block I/O commands from file I/O commands and accesses the storage devices in accordance with the created block I/O commands. In a case where the file cache area is lacking an area to cache first data of a received first file I/O command, the controller chooses one of a first cache method that newly creates a free area in the file cache area to cache the first data in the file cache area and a second cache method that caches the first data in the block cache area without caching the first data in the file cache area.

15 Claims, 28 Drawing Sheets

Fig. 6

FILE CACHE INFORMATION TABLE (211)

| CACHE ADDRESS (2110) | VOLUME NUMBER (2111) | VOLUME ADDRESS (2112) | ATTRIBUTE INFORMATION (2113) | LAST ACCESS TIME (2114) |
|---|---|---|---|---|
| 0x00000000 | 0 | 0x11110000 | i-node | 0:00:00 |
| 0x00001000 | 0 | 0x0000B000 | i-node, USER DATA | 0:10:00 |
| 0x00002000 | 1 | 0x0000E000 | JOURNAL DATA | 2:00:00 |
| 0x00003000 | - | - | - | - |
| 0x00003100 | 3 | 0x00110000 | USER DATA | 0:30:00 |
| 0x00003200 | 3 | 0x00120000 | USER DATA | 0:30:00 |

Fig. 8

| CACHE COOPERATION INFORMATION TABLE | |
|---|---|
| FILE CACHE EARLIEST LAST ACCESS TIME | 5:00:00 |
| FILE CACHE AVERAGE LAST ACCESS TIME | 6:06:00 |
| FILE CACHE HIT RATE | 80% |
| FILE CACHE FREE AREA | 0 |
| BLOCK CACHE EARLIEST LAST ACCESS TIME | 0:10:00 |
| BLOCK CACHE AVERAGE LAST ACCESS TIME | 3:07:00 |
| BLOCK CACHE HIT RATE | 20% |
| BLOCK CACHE FREE AREA | 20 |

Fig. 18

| CACHE ADDRESS | VOLUME NUMBER | VOLUME ADDRESS | ATTRIBUTE INFORMATION | ACCESSING HOST | LAST ACCESS TIME |
|---|---|---|---|---|---|
| 0x00000000 | 0 | 0x00000000 |  | INTERNAL1 | 0:00:00 |
| 0x00000040 | 0 | 0x0000C000 |  | INTERNAL2 | 0:00:01 |
| 0x00000080 | 1 | 0x0000FFFF | HIGH-PRIORITY RELEASE | EXTERNAL | 2:00:30 |
| 0x000000C0 | 10 | 0x00000000 | HIGH-PRIORITY RELEASE | INTERNAL1 | 2:00:00 |
| 0x00000140 | 12 | 0x0000FFFF |  | EXTERNAL | 0:00:08 |
| 0x00000180 | 15 | 0x0000FFFF |  | INTERNAL1 | 0:00:00 |

BLOCK CACHE INFORMATION TABLE 311

STORAGE APPARATUS AND CONTROL METHOD FOR STORAGE APPARATUS

TECHNICAL FIELD

This invention relates to a storage apparatus and a control method for the storage apparatus.

BACKGROUND ART

In recent years, expansion of the application field of information systems and development of distributed computer systems have brought drastic increase in the number of hosts managed in a site. This trend raises a problem of increase in the management cost of computer systems. In particular, if storage devices mounted on distributed hosts are individually managed, the storage size required for operation is difficult to be estimated. Accordingly, when the computer system needs to increase the capacity, it is required to individually add storage devices to the hosts. Consequently, the management cost goes up.

To solve this problem, technologies of storage area network (SAN) and network attached storage (NAS) are employed. Both of these technologies aim to consolidate storage devices which are individually owned by distributed hosts; however, these are used in different application fields because of their distinctiveness.

The SAN connects a plurality of storage apparatuses to a plurality of hosts by a network dedicated to communication among the hosts and the storage apparatuses to achieve high-speed and low-latency input/output (I/O). In the SAN, I/O between a host and a storage apparatus is performed by blocks. The block is a management unit for fixed-length data, which is obtained by dividing the whole storage space of a storage apparatus into units having a predetermined size and identified by an address.

A typical application suitable for block-based I/O is database. Consolidating volumes of a plurality of database servers into a single storage apparatus and unifying the management can reduce the management cost of the computer system. In addition, since the SAN is a highly reliable dedicated network to perform efficient communication, it is effective to use the SAN as a communication channel for volume-based data transfer. The volume-based data transfer is used to replicate a volume at a remote storage apparatus for the purposes of backup and disaster planning.

On the other hand, the NAS is a storage apparatus having a file server capability to provide file services to a plurality of hosts in a local area network (LAN). The I/O between the NAS and a host is performed by files. The file is a management unit for variable-length data, which is typically identified by a text identifier. A typical application suitable for file-based I/O is file sharing by a plurality of hosts, which achieves a service that a plurality of web servers distribute the same contents or document sharing by a plurality of office personal computers.

In this way, the SAN and the NAS are technologies that complement each other. Therefore, the following idea comes up: integrating a storage apparatus supporting the SAN and a NAS into a single apparatus will achieve further reduction in the management cost. The technique disclosed in the following PTL 1, US 2005/0172043 A, configures the control program for a storage apparatus so as to control both of the SAN and the NAS; consequently, a storage apparatus supporting both of the SAN and the NAS can be attained. The storage apparatus employing this technique has interfaces for the SAN and the NAS, so that it can allocate the storage space to the SAN and the NAS without restriction.

CITATION LIST

Patent Literature

PTL 1: US 2005/0172043 A

SUMMARY OF INVENTION

Technical Problem

In the technique disclosed in the above-listed US 2005/0172043 A, a program (block processing program) for processing I/O from a SAN host, which accesses a storage apparatus via a SAN, and a program (file processing program) for processing I/O from a NAS host, which uses a NAS, are independent from each other to cache data for the programs independently.

However, since the both programs do not share the cache space, some I/O pattern is not allowed to use a sufficient size of cache; hence, the usage efficiency of the cache is impaired.

Solution to Problem

An aspect of this invention is a storage apparatus for receiving block I/O commands and file I/O commands, the storage apparatus including a plurality of storage devices for storing data of block I/O commands and file I/O commands and a controller including a block cache area and a file cache area. The controller creates block I/O commands from file I/O commands and accesses the plurality of storage devices in accordance with the created block I/O commands. The file cache area caches data of file I/O commands. The block cache area caches data of block I/O commands. In a case where the file cache area is lacking an area to cache first data of a received first file I/O command, the controller chooses one of a first cache method that newly creates a free area in the file cache area to cache the first data in the file cache area and a second cache method that caches the first data in the block cache area without caching the first data in the file cache area.

Advantageous Effects of Invention

According an aspect of this invention, cache areas of a storage apparatus can be used efficiently.

BRIEF DESCRIPTION OF DRAWINGS

FIG. 6 illustrates an exemplary configuration of a file cache information table in Example 1.

FIG. 8 illustrates an exemplary configuration of a cache cooperation information table in Example 1.

FIG. 18 illustrates an exemplary configuration of a block cache information table in Example 2.

DESCRIPTION OF EMBODIMENTS

Hereinafter, embodiments of this invention will be described with reference to the accompanying drawings. It should be noted that the embodiments are merely examples to realize this invention and does not limit the technical scope of this invention. The following description provides explanations about a storage apparatus having multiple interfaces, such as a hybrid storage apparatus which supports data accesses in accordance with both of storage area network (SAN) interface commands and network attached storage (NAS) interface commands.

EXAMPLE 1

Figure 1:
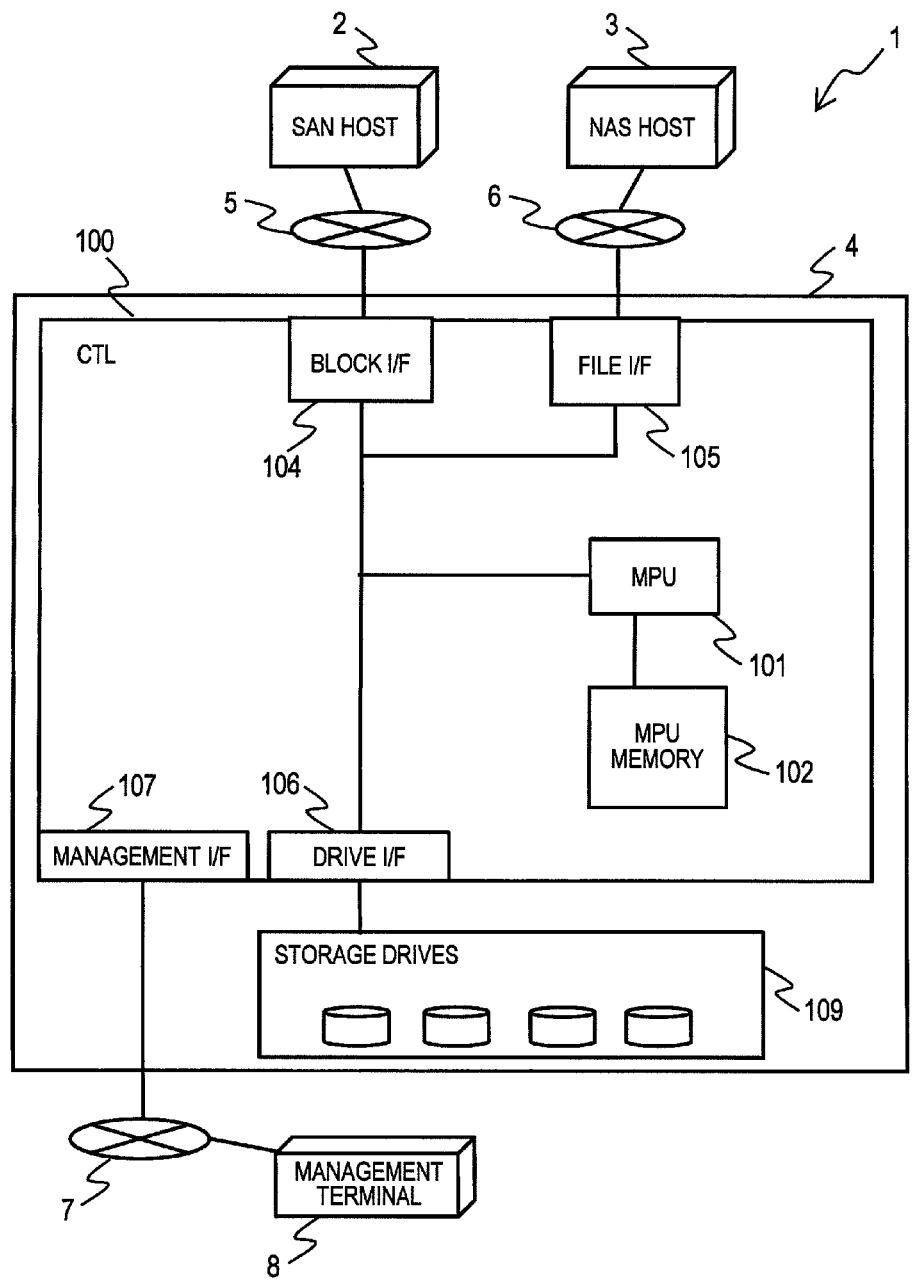
FIG. 1 is a block diagram illustrating an overall configuration of a computer system in Embodiment 1.

FIG. 1 is a block diagram illustrating an overall configuration of a computer system in this embodiment. The computer system 1 in FIG. 1 includes a SAN host 2, a NAS host 3, a management terminal 8, and a storage apparatus 4.

The SAN host 2 is an example of a host that uses a block storage apparatus; it issues block I/O requests (block I/O commands) and accesses data by blocks. The NAS host 3 is an example of a host that uses a file storage apparatus; it issues file I/O requests (file I/O commands) and accesses data by files. The storage apparatus 4 has capabilities of both of the block storage apparatus and the file storage apparatus.

The computer system 1 further includes data networks for block storage and file storage, such as a storage area network (SAN) 5 and a local area network (LAN) 6. In addition, the computer system 1 includes a management LAN 7. The SAN 5 may be a network that supports a protocol such as Fibre Channel, FCoE, or iSCSI; the LAN 6 may be a TCP/IP network.

The SAN host 2 is communicably connected to the storage apparatus 4 via the SAN 5. The NAS host 3 is communicably connected to the storage apparatus 4 via the LAN 6. The management terminal 8 is communicably connected to the storage apparatus 4 via the management LAN 7. The SAN host 2 and the NAS host 3 may be mainframes, servers, or client terminals The SAN host 2 and the NAS host 3 may be directly connected to the storage apparatus 4 without the SAN 5 and the LAN 6. The management terminal 8 may be directly connected to the storage apparatus 4 without the management LAN 7.

The storage apparatus 4 in FIG. 1 includes a storage controller (CTL) 100 and storage drives 109 controlled by the CTL 100. The CTL 100 includes an MPU 101, which is a processor, an MPU memory 102, which is a primary storage device, a block interface (I/F) 104, a file I/F 105, a drive I/F 106, and a management I/F 107.

The CTL 100 communicates with the SAN host 2 via the block I/F 104, communicates with the NAS host 3 via the file I/F 105, communicates with the storage drives 109 via the drive I/F 106, and communicates with the management terminal 8 via the management I/F 107. The storage drives 109 are composed of storage drives such as magnetic disk drives and solid state drives.

Although not shown in the drawing, the storage drives 109 are configured to have logical storage areas (called logical volumes) each allocated a plurality of continuous address spaces. The SAN host 2 issues I/O commands for blocks (hereinafter, referred to as block commands), which are to use the address spaces of the logical volumes, to the storage apparatus 4 via the block I/F 104.

The NAS host 3 issues I/O commands for files (hereinafter, referred to as file commands) to the storage apparatus 4 via the file I/F 105. The file commands can designate partial data in a file. Although the storage apparatus in this example has one CTL, the storage apparatus may have a plurality of CTLs to achieve redundancy, which can enhance the availability of the system.

Figure 2:
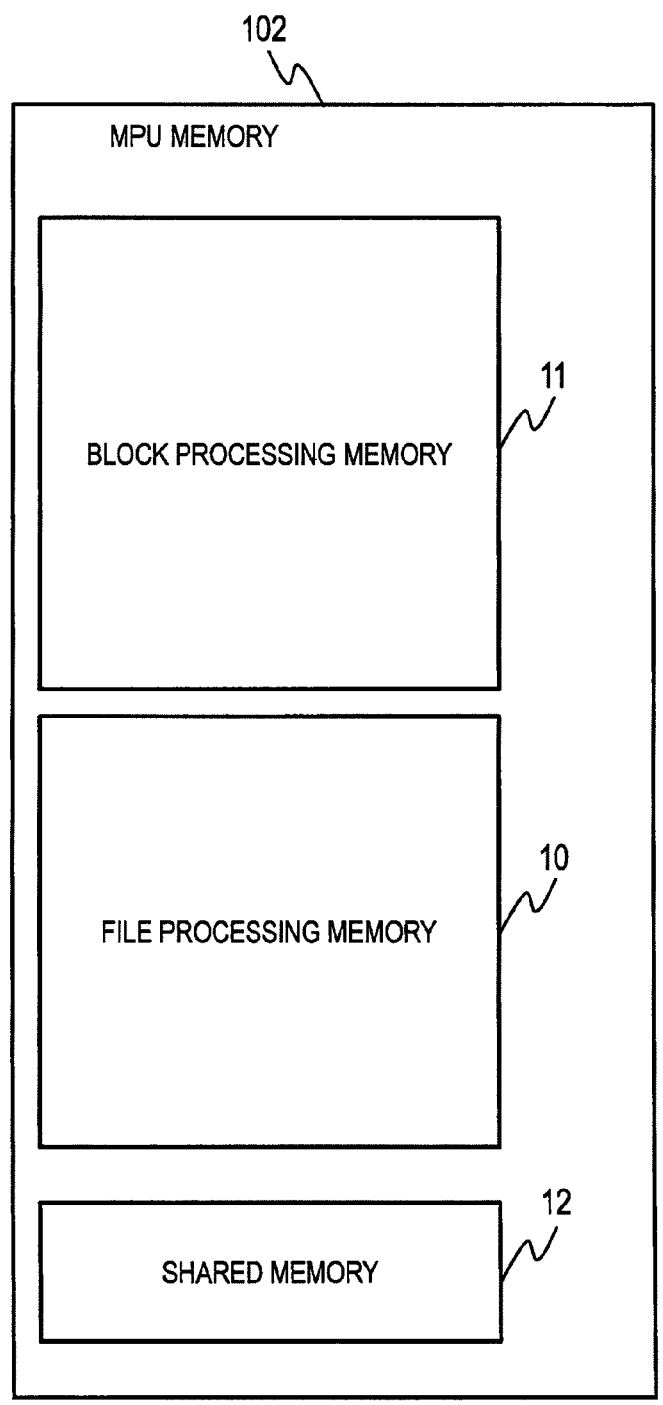
FIG. 2 illustrates an exemplary configuration of an MPU memory in Example 1.

Next, configurations of programs, control information, and data to be stored in the MPU memory 102 will be described with reference to FIG. 2. FIG. 2 is a configuration diagram of the MPU memory 102 in this example. The MPU memory 102 has three areas: a file processing memory 10, a block processing memory 11, and a shared memory 12.

Figure 3:
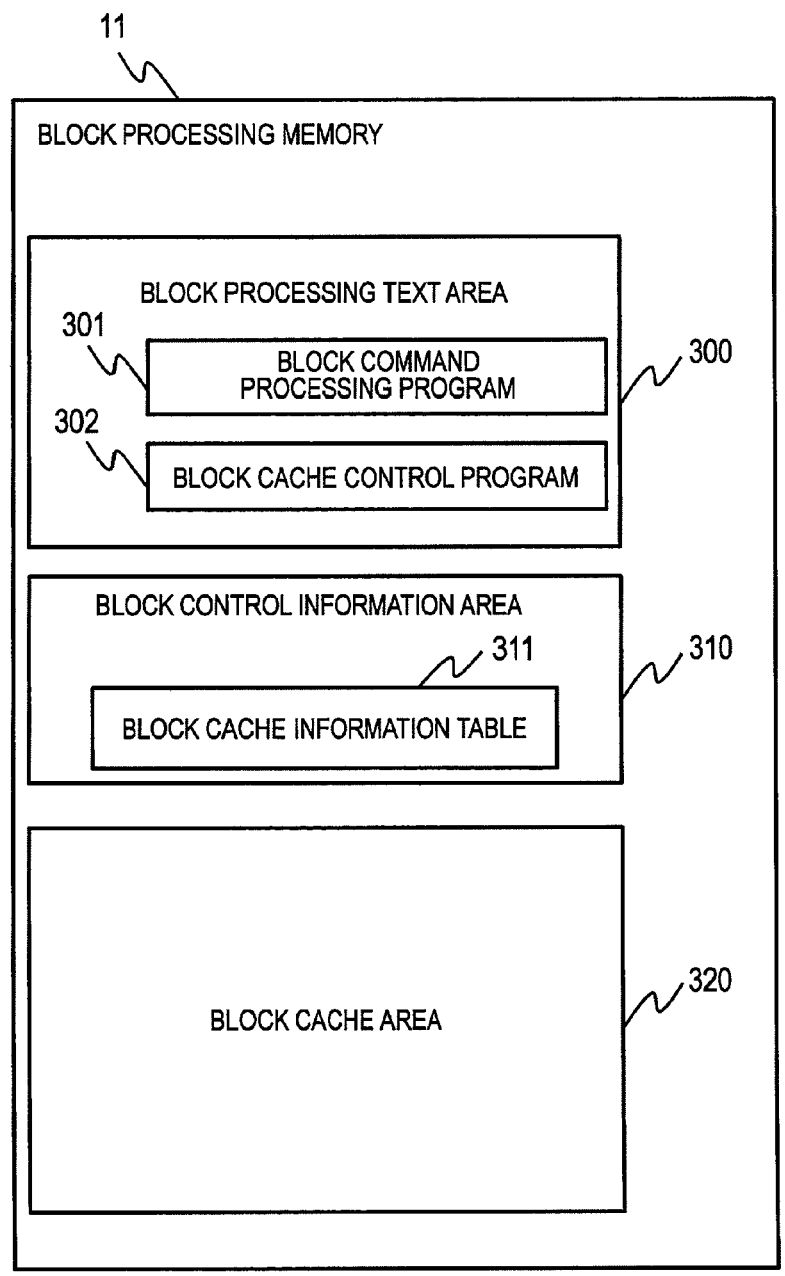
FIG. 3 illustrates an exemplary configuration of a block processing memory in Example 1.

FIG. 3 illustrates an exemplary configuration of the block processing memory 11. The block processing memory 11 has a block processing text area 300, a block control information area 310, and a block cache area 320, which respectively store programs, control information, and various kinds of data.

The block processing text area 300 stores programs to perform processing and functions of the storage apparatus for reading and writing data upon receipt of a block command issued by the SAN host 2; the MPU 101 accesses this area as necessary to execute the programs. Specifically, the block processing text area 300 stores a block command processing program 301 and a block cache control program 302. The programs to be stored in the block processing text area 300 are collectively called a block processing program.

The block command processing program 301 is a program for receiving block commands issued by the SAN host 2 or a later-described file processing program (refer to FIG. 4) and executing a read/write of data.

The block command processing program 301 executes a block read or a block write responsive to a block command from the SAN host 2 or the file processing program. The process flows of the block read and the block write will be described with reference to FIGS. 14 and 15. When the block command processing program 301 is executed, the block command processing program 301 invokes the block cache control program 302 as necessary and makes it perform a part of the processing.

The block control information area 310 stores a block cache information table 311. The block cache area 320 is an area to temporarily hold user data to be read or written in accordance with a block command from the SAN host 2 or the later-described file processing program.

To reduce time-consuming accesses to the storage drives, a part of the user data in the storage drives is retained in the block cache area 320 of the MPU memory 102 that can be accessed in a shorter time than the storage drives. Furthermore, the block cache area 320 plays a role to expedite a write access to the storage apparatus 4.

Since the block cache area 320 is finite, the CTL 100 uses the stored blocks while replacing them one after another. The algorithm to select a block to be replaced is important. This example employs a method called least recently used (LRU) by way of example. The LRU is an algorithm that determines to replace the data that has not been accessed for the longest time.

In processing a block command for a read, the block cache control program 302 determines whether the object data is held in the block cache area 320. The condition that the block cache area 320 includes the object data is called a hit or a cache hit; the condition that it does not include the data is called a miss or a cache miss.

In the case of a cache hit, the block cache control program 302 retrieves the data from the block cache area 320 and returns the data to the SAN host 2 or the file command processing program 201 that has issued the block command. In the case of a cache miss, the block cache control program 302 retrieves the data from the storage drives 109.

In processing a block command for a write, the block cache control program 302 stores object data in the block cache area 320. The block cache control program 302 can return a response to the SAN host 2 or the file command processing program 201 that has issued the block command upon storing the data in the block cache area 320 to reduce the response time. The data written in the block cache area 320 is asynchronously written to the storage drives 109.

Figure 4:
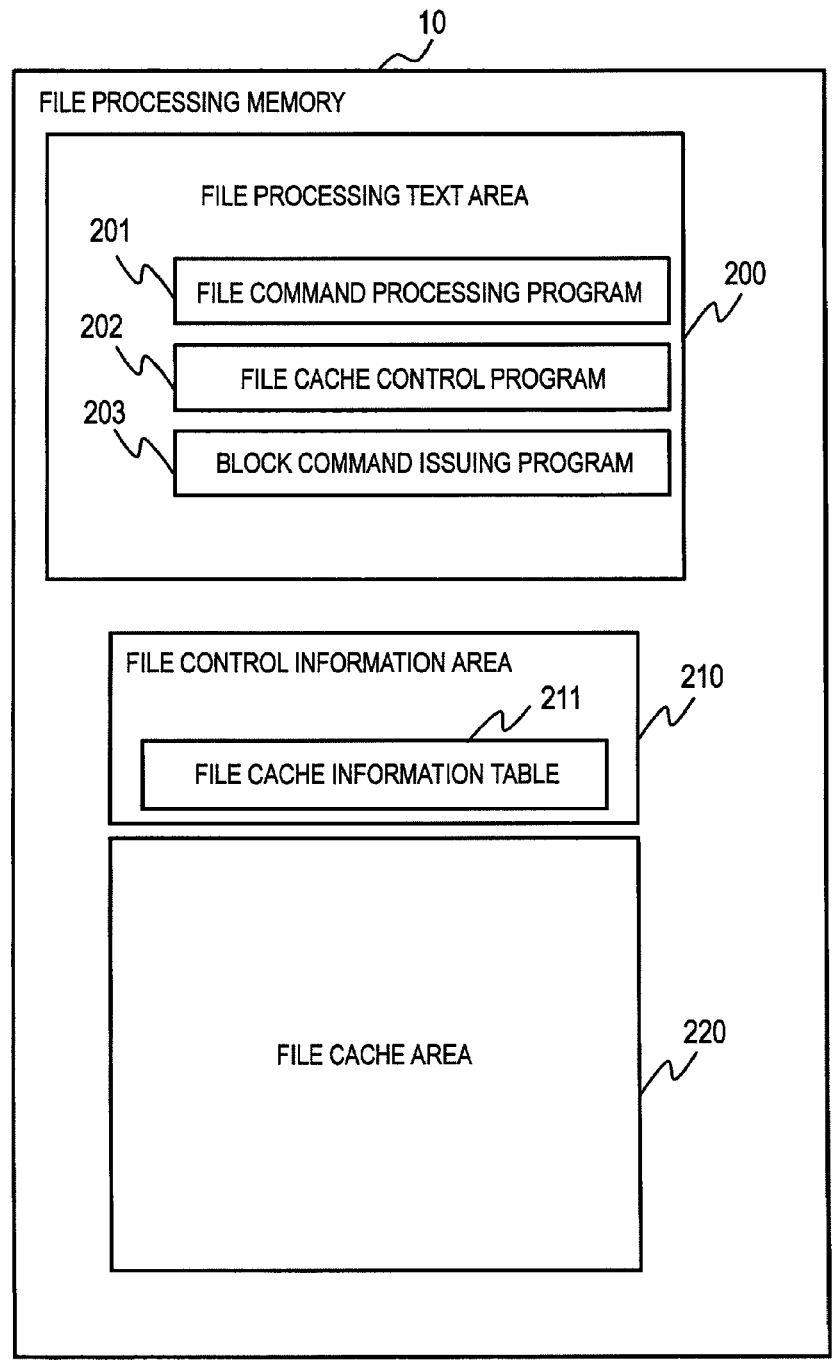
FIG. 4 illustrates an exemplary configuration of a file processing memory in Example 1.

FIG. 4 illustrates an exemplary configuration of the file processing memory 10. The file processing memory 10 has a file processing text area 200, a file control information area 210, and a file cache area 220, which respectively store programs, control information, or various kinds of data.

The file processing text area 200 stores programs to perform processing and functions of the storage apparatus for reading and writing data; the MPU 101 accesses this area as necessary to execute the programs. Specifically, the file processing text area 200 stores a file command processing program 201, a file cache control program 202, and a block command issuing program 203. The programs to be stored in the file processing text area 200 are collectively called a file processing program.

In order to access data, the file processing program issues block I/O commands for logical volumes, like the SAN host 2, internally to the block processing program.

The file command processing program 201 is a program to receive file commands issued by the NAS host 3 and execute read and write of data. The file command processing program performs a read or a write of a designated file responsive to a file command from the NAS host 3.

The target that the NAS host 3 designates for data read/write in a file command is provided in the form of a file, which is identified by a file name and has a variable length. The file command processing program 201 converts the file command into a block command based on the file system. That is to say, the program converts the format of the file command into the format of a block command which designates the logical volume containing the data of the file system the designated file belongs to and the logical addresses of the blocks corresponding to the object file.

The obtained block command is issued by the method suitable for the target logical volume, by invoking the block command issuing program 203. In other words, if the logical volume containing the file system is in the same storage apparatus, the block command issuing program 203 issues a block command to the block command processing program 301 in the same enclosure via the shared memory 13.

If the logical volume containing the file system is in an external storage apparatus connected via the SAN 5, the block command is issued to the external storage apparatus through the block I/F 104 via the SAN 5.

The data to be read or written by the issued block command includes metadata, such as i-node and journal data in a journaling file system, in addition to the substance of the file and is read or written as one or more continued fixed-length areas (blocks) indicating the data.

When the block command issuing program 203 is executed, the block command issuing program 203 invokes the file cache control program 202 as necessary and makes it execute a part of the processing.

Specifically, the file cache control program 202 performs caching of blocks to the file cache area 220. It stores a retrieved block in the file cache area 220 and retrieves the stored block for a future read of the same block to achieve a high-speed access. The file cache control program 202 employs the LRU method as an algorithm to select a block to be replaced, like the block cache control program 302. The details of the block command issuing program 203 will be described with reference to FIGS. 9 to 11.

The file control information area 210 stores a file cache information table 211. The file cache area 220 is to temporarily hold user data read or written by the NAS host 3 in accordance with a file command.

Figure 5:
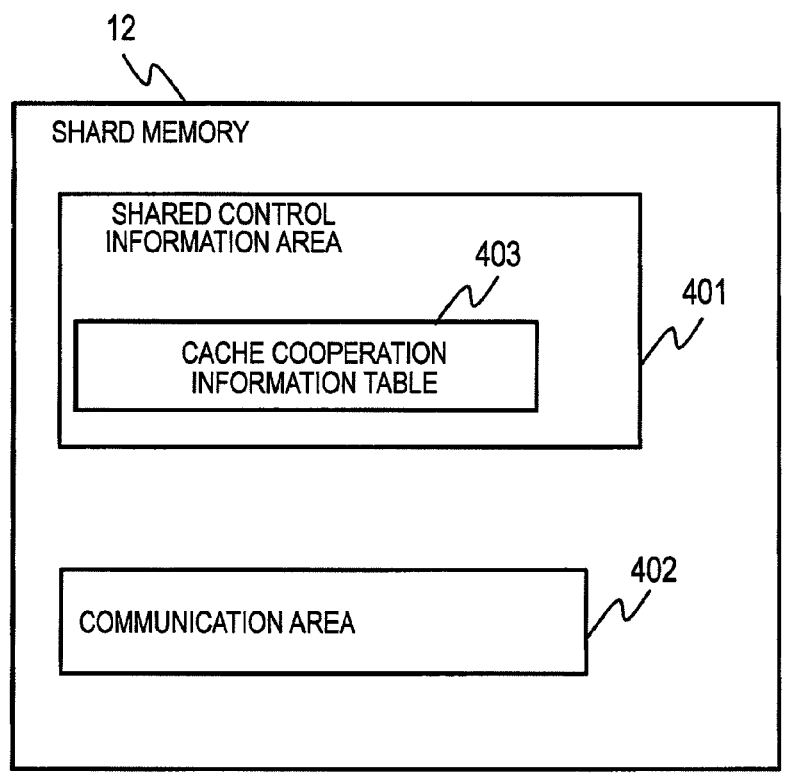
FIG. 5 illustrates an exemplary configuration of a shared memory in Example 1.

FIG. 5 illustrates an exemplary configuration of the shared memory 12. The shared memory 12 is an area readable and writable by both of the block processing program and the file processing program and is used for communication between them. The block processing memory 11 is accessed only by the block processing program and the file processing memory 10 is accessed only by the file processing program. The shared memory 12 is used to store information to be accessed by the both.

The shared memory 12 has a shared control information area 401 and a communication area 402. The shared control information area 401 stores control information required to be shared by a block processing program and a file processing program. Specifically, a cache cooperation information table 401 is exemplified. The communication area 402 is an area to be used when a block processing program communicates with a file processing program and can be read or written by both of them.

The cache cooperation information table 401 stores control information required for the file cache control program 202 and the block cache control program 302 to cooperate.

The block command issuing program 203 uses the block file communication area 402 to issue a command to the block command processing program 301 or to receive a response from the block command processing program 301.

It should be noted that the file processing program can communicate necessary information with the block processing program without using the shared memory 12. The file processing program and the block processing program may ask each other for necessary information and respond to each other without using the cache cooperation information table 401.

The MPU 101 executes programs retained in the MPU memory 102 to implement predetermined functions. The programs are executed by the MPU 101 to perform predetermined processing using the storage devices and communication interfaces. Therefore, a description in this example or the other examples made with a subject of a program may be a description with a subject of the MPU 101. Alternatively, processing performed by a program is processing performed by the storage apparatus 4 on which the program runs or the system including the storage apparatus 4.

The MPU 101 operates in accordance with programs to operate as functional parts (means) for realizing predetermined functions. For example, the MPU 101 functions as a block command processor and a file command processor. The storage apparatus 4 is an apparatus including these functional parts. At least some of the programs may be realized by dedicated hardware.

For convenience of explanation, the programs are shown in the MPU memory 102, but typically, the programs are loaded from the storage area of a secondary storage device to the MPU memory 102. The secondary storage device is a storage device including a non-volatile non-transitory storage medium for storing programs and data necessary to realize the predetermined functions, and is mounted on the storage apparatus 4 or connected to the storage apparatus 4 via a network.

In this example or the other examples, information to be used by the system does not depend on the data structure but may be expressed in any data structure. For example, a data structure appropriately selected from a table, a list, a database and a queue can store information. To describe the substance of information, terms such as identification information, identifier, name, and ID are used, but they can be replaced with one another.

FIG. 6 is an exemplary configuration of the file cache information table 211. The file cache information table 211 is a table to manage information on pieces of cache data stored in the file cache area 220 and includes a plurality of entries each having a cache address field 2110, a volume number field 2111, a volume address field 2112, an attribute information field 2113, and a last access time field 2114.

The cache address field 2110 stores a value indicating the address of a particular cache area in the file cache area 220. The volume number field 2111 and the volume address field 2112 store the logical volume number of the cached data and its address in the logical volume, respectively.

The attribute information field 2113 stores information to specify the characteristic of the data and its behavior in caching. For example, information indicating whether the data is user data or metadata such as i-node is stored in the form of one or more character strings. The last access time field 2114 stores a value indicating the latest time of the access to the data for a read or a write. For a free area (an unoccupied cache area which holds no data), each field contains no value (denoted by "-" in the drawing).

These pieces of information about the cache area are updated by the file cache control program 202 when new cache data is stored, when cache data is replaced, when cache data is deleted and the area is released (becomes a free area), or when the cache area is accessed for a cache hit, to indicate the latest information every time.

Figure 7:
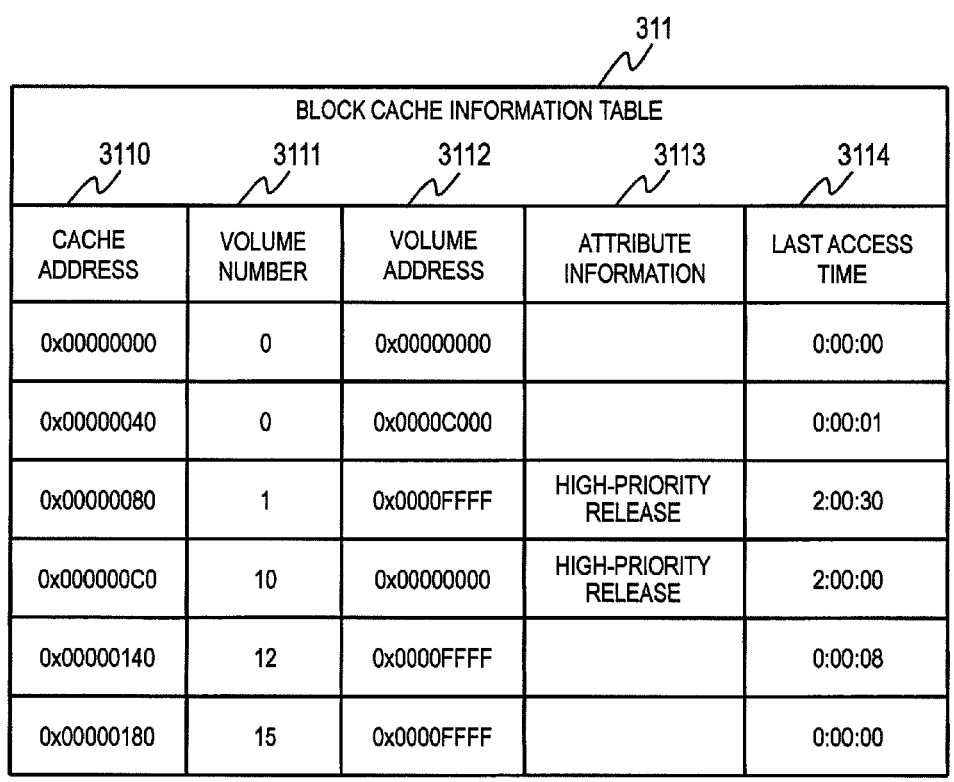
FIG. 7 illustrates an exemplary configuration of a block cache information table in Example 1.

FIG. 7 is an exemplary configuration of the block cache information table 311. The block cache information table 311 is a table to manage information on pieces of cache data stored in the block cache area 320 and includes a plurality of entries each having a cache address field 3110, a volume number field 3111, a volume address field 3112, an attribute information field 3113, and a last access time field 3114.

The cache address field 3110 stores a value indicating the address of a cache area in the block cache area 320. The volume number field 3111 and the volume address field 3112 store the logical volume number of the cached data and its address in the logical volume, respectively.

The attribute information field 3113 stores information to specify the characteristic of the data and its behavior in caching. For example, information such as HIGH-PRIORITY RELEASE, which indicates that the cached data should be preferentially released, is stored in the form of one or more character strings. The last access time field 3114 stores a value indicating the latest time of the access to the data for a read or a write. For a free area (an unoccupied cache area which holds no data), each field contains no value (denoted by "-" in the drawing).

These pieces of information about the cache area are updated by the block cache control program 302 when new cache data is stored, when cache data is replaced, when cache data is deleted and the area is released (becomes a free area), or when the cache area is accessed for a cache hit, to indicate the latest information every time.

FIG. 8 is an exemplary configuration of the cache cooperation information table 403. The cache cooperation information table 403 is a table of information necessary for the block cache control program 302 and the file cache control program 202 to cooperate in operation.

The cache cooperation information table 403 has a file cache earliest last access time field 4030, a file cache average last access time field 4034, a file cache hit rate field 4031, a file cache free area field 4036, a block cache earliest last access time field 4032, a block cache average last access time field 4035, a block cache hit rate field 4033, and a block cache free area field 4037.

The file cache earliest last access time field 4030 stores the last access time of the cache area of the data that has the earliest last access time in the pieces of data held in the file cache area 220. The file cache average last access time field 4034 stores an average value of the last access times of the pieces of data held in the file cache area 220.

The file cache hit rate field 4031 stores a hit rate in the file cache area 220 (a rate of the number of cache hits to the total number of accesses). The file cache free area field 4036 stores the number of free areas in the file cache area 220. The values of the fields are updated by the file cache control program 202 as needed.

The block cache earliest last access time field 4032 stores the last access time of the cache area of the data that has the earliest last access time in the pieces of data held in the block cache area 320. The block cache average last access time field 4035 stores an average value of the last access times of the pieces of data held in the block cache area 320.

The block cache hit rate field 4033 stores a hit rate in the block cache area 320 (a rate of the number of cache hits to the total number of accesses). The block cache free area field 4037 stores the number of free areas in the block cache area 320. The values of the fields are updated by the block cache control program 302 as needed.

Figure 9:
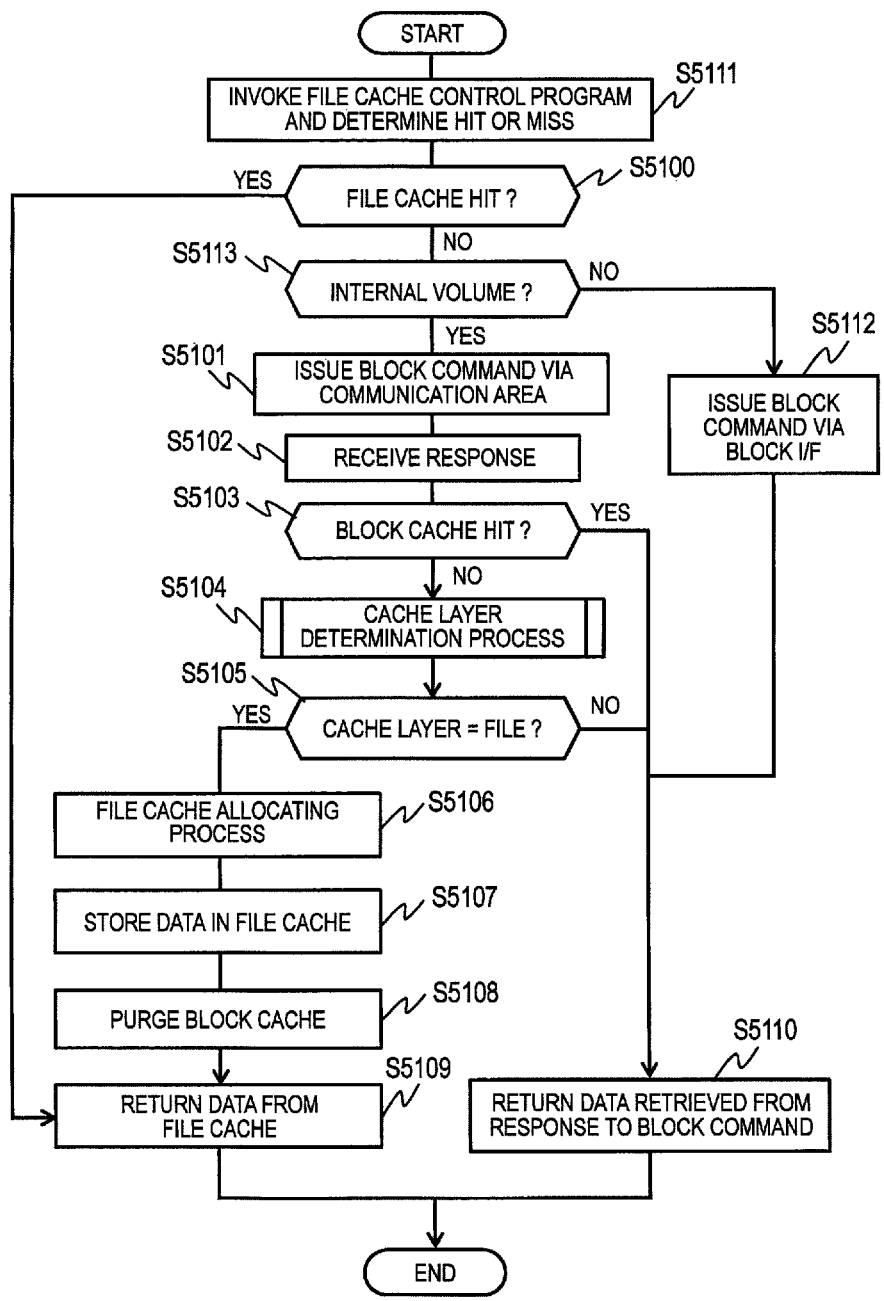
FIG. 9 illustrates a first exemplary process flow of issuing a read command by a block command issuing program in the file processing program in Example 1.

FIG. 9 is a first exemplary process flow of issuing a read command by the block command issuing program 203 of the file processing program. Some of the steps are executed using other programs.

This process (the block command issuing program 203) is typically invoked by the file command processing program 201 and executed to read a block allocated for a file or metadata related thereto. The process is invoked with information indicating the logical volume number indicating the read target block and the logical block address in the volume, namely the values themselves or information leading to the values.

The block command issuing program 203 first invokes the file cache control program 202 (Step S5111). The file cache control program 202 determines whether the requested data is in the file cache area 220 (a cache hit) or not (a cache miss), with reference to the file cache information table 211.

In the case of a cache hit (YES at Step S5100), the file cache control program 202 retrieves the object data from the file cache area 220 and updates the file cache information table 211. The file cache control program 202 returns the object data to the command originator (NAS host 3) (Step S5109).

In the case of a cache miss (NO at Step S5100), the block command issuing program 203 proceeds to Step S5113. At Step S5113, the block command issuing program 203 determines whether the logical volume holding the object data is in the same apparatus enclosure or in an external storage apparatus (S5113).

The file control information area 210 retains a not-shown volume information table, which includes information indicating the storage location of volume data. The block command issuing program 203 can make the determination of Step S5113 with reference to this volume information table.

If the object data is in the same apparatus enclosure (YES at Step S5113), the block command issuing program 203 proceeds to Step S5101. If the object data is held in an external storage apparatus (NO at Step S5113), the block command issuing program 203 issues a command to the external storage apparatus via the block I/F 104 (Step S5112), retrieves data from the response thereto, and returns it to the invocator of the block command issuing program 203 without storing it in the file cache area 220 (Step S5110).

At Step S5101, the block command issuing program 203 issues a block command to the block command processing program 301 via the communication area 402. The block command processing program 301 executes later-described block read command processing (refer to FIG. 14) in accordance with the received block command. The block command issuing program 203 receives a response from the block command processing program 301 via the communication area 402 (Step S5102). The response information includes the object data and information indicating whether a cache hit has occurred in the block cache area 320.

The block command issuing program 203 determines whether a cache hit has occurred in the block cache area 320 with reference to the response information (Step S5103). In the case of a cache hit (YES at Step S5103), the block command issuing program 203 proceeds to Step S5110 to return the data to the invocator.

In the case of a cache miss in the block cache area 320 (NO at Step S5103), the block command issuing program 203 invokes a cache layer determination process of the file cache control program 202 (S5104). The cache layer determination process will be described with reference to FIGS. 12 and 13; it determines in which cache area (layer) to store the data, the file cache area 220 or the block cache area 320.

If the result of the determination indicates the block layer (NO at Step S5105), the block command issuing program 203 proceeds to Step S5110, retrieves the data from the response to the block command, returns the data to the invocator, and ends. This data is not stored in the file cache area 220.

If the result of the determination indicates the file layer (YES at Step S5105), the block command issuing program 203 first invokes a file cache allocating process in the file cache control program 202 to allocate a free area in the file cache area 220 (Step S5106). The area to be allocated may be determined in accordance with the LRU algorithm. For example, the cache data having the earliest access time in the last access time field of the file cache information table 211 is deleted to allocate a free area.

The block command issuing program 203 stores the data in the area allocated this way by the file cache control program 202 (Step S5107). The file cache control program 202 stores the data in the file cache area 220, creates a new entry in the file cache information table 211, and updates the entry with the information on this data.

Next, the block command issuing program 203 invokes a block cache control program 302 via the communication area 402 and makes it delete the data from the block cache area 320 (hereinafter, this operation is referred to as purge) (Step S5108). Then, the block command issuing program 203 returns the data from the file cache area 220 to the invocator of the block command issuing program 203 (S5109). These steps eliminate the same data from being cached in the two cache areas 220 and 320.

At Step S5108, instead of making the block cache control program 302 purge the data, the block command issuing program 203 may provide information to preferentially release the data.

Specifically, the block command issuing program 203 instructs the block cache control program 302 to add HIGH-PRIORITY RELEASE to the attribute information field 3113 of the entry corresponding to this data in the block cache information table 311. This operation enables deletion of doubled cache data within the scope of the original cache control by the block cache control program 302, without implementing a purge function to the block cache control program 302.

Figure 10:
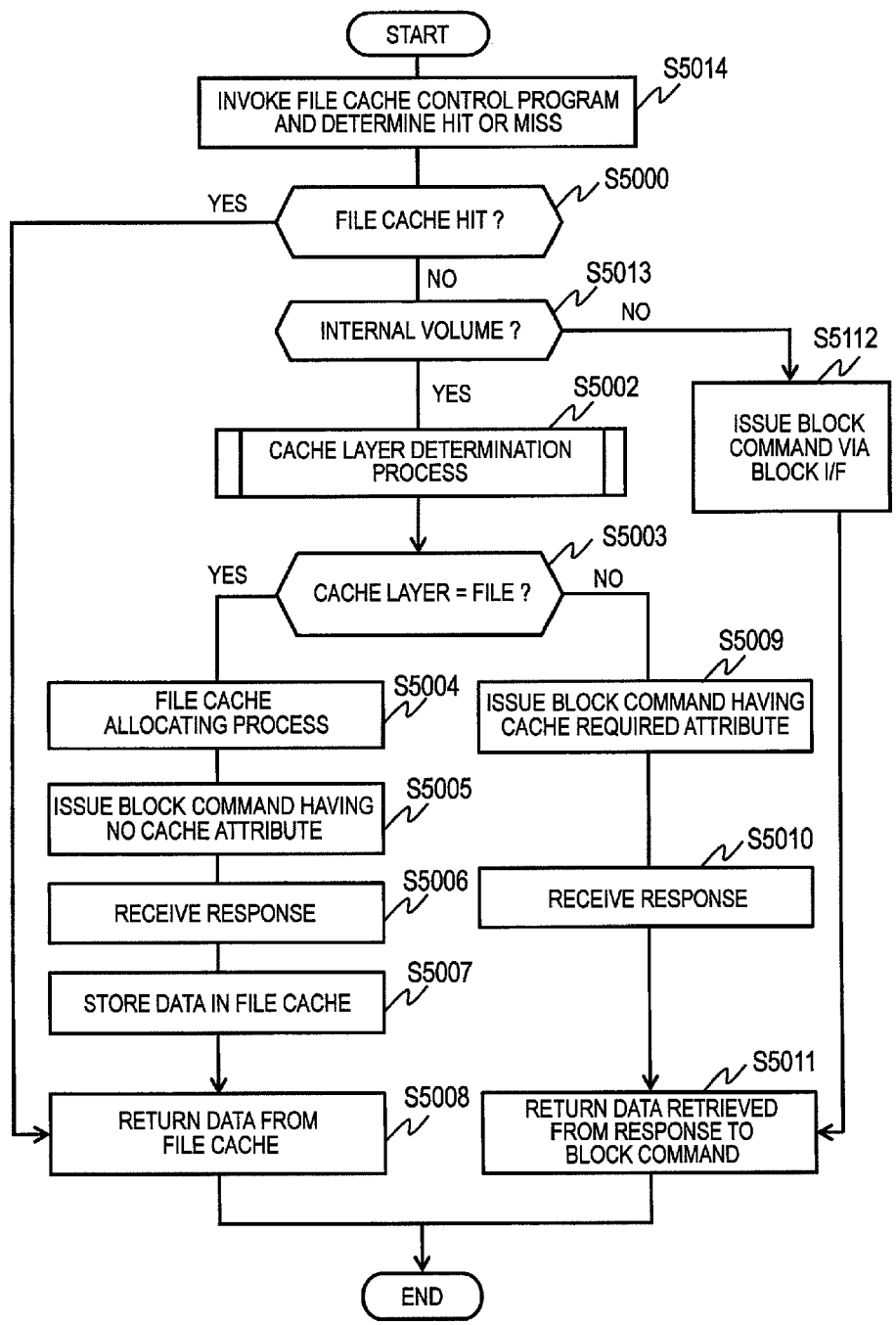
FIG. 10 illustrates a second exemplary process flow of issuing a read command by the block command issuing program in Example 1.

FIG. 10 is a second exemplary process flow of issuing a read command by the block command issuing program 203. The block command issuing program 203 first invokes the file cache control program 202 (Step S5014). The file cache control program 202 determines whether the requested data is in the file cache area 220 (a cache hit), with reference to the file cache information table 211 (Step S5000).

In the case of a cache hit (YES at Step S5000), the file cache control program 202 retrieves the data from the file cache area 220 and returns the data to the command originator (Step S5008). In the case of a cache miss (NO at Step S5000), the block command issuing program 203 determines whether the object data is held in a logical volume in the same apparatus enclosure or in a logical volume in an external storage apparatus (S5013). Since the operations at Steps S5013 and S5112 are the same as Steps 5113 and S5112 in FIG. 9, the explanations thereof are omitted.

If the object data is in the same apparatus enclosure (YES at Step S5013), the block command issuing program 203 invokes a cache layer determination process of the file cache control program 202 (Step S5002). The cache layer determination process will be described with reference to FIGS. 12 and 13.

The block command issuing program 203 determines whether the result of the foregoing determination is the file layer (the file cache area 220) or the block layer (the block cache area 320) (Step S5003) and if the result of the determination indicates the file layer (YES at Step S5003), the block command issuing program 203 invokes a file cache allocating process of the file cache control program 202 to allocate a free area in the file cache area 220 (S5004).

Next, the block command issuing program 203 issues a block command to the block command control program 302 via the communication area 402 after attaching attribute information of NO CACHE to the block command (S5005). This step can prevent the data from being cached in the block cache area 320.

The attribute to be assigned at this step may be NO CACHE indicating not to be cached or HIGH-PRIORITY RELEASE indicating to release the data preferentially even though it is cached. The attribute information may be stored in the block command or stored in an area in the communication area 402. Storing the attribute information in the block command promotes efficiency in processing for instructions on the attribute.

The block command processing program 301 performs later-described block read command processing (refer to FIG. 14), in accordance with the received block command. The block command issuing program 203 receives a response from the block command processing program 301 (S5006).

The block command issuing program 203 invokes the file cache control program 202 and the file cache control program 202 stores the received data in the file cache area 220, creates a new entry in the file cache information table 211, and updates the entry with the information on the data (S5007). The file cache control program 202 acquires data from the file cache area and returns it to the command originator (S5008).

If the result of the determination indicates the block layer (NO at Step S5003), the block command issuing program 203 issues a block command to the block command control program 302 via the communication area 402 after attaching attribute information of CACHE REQUIRED to the block command (Step S5009). The block command control program 302 performs later-described block read command processing (refer to FIG. 14) in accordance with the received block command.

The block command issuing program 203 receives a response from the block command processing program 301 (Step S5010) and returns the data to the command originator (S5011). The received data is not stored in the file cache area 220. It should be noted that the attaching attribute at Step S5009 is not necessarily required. This is because the block cache control program 302 usually caches read data.

Figure 11:
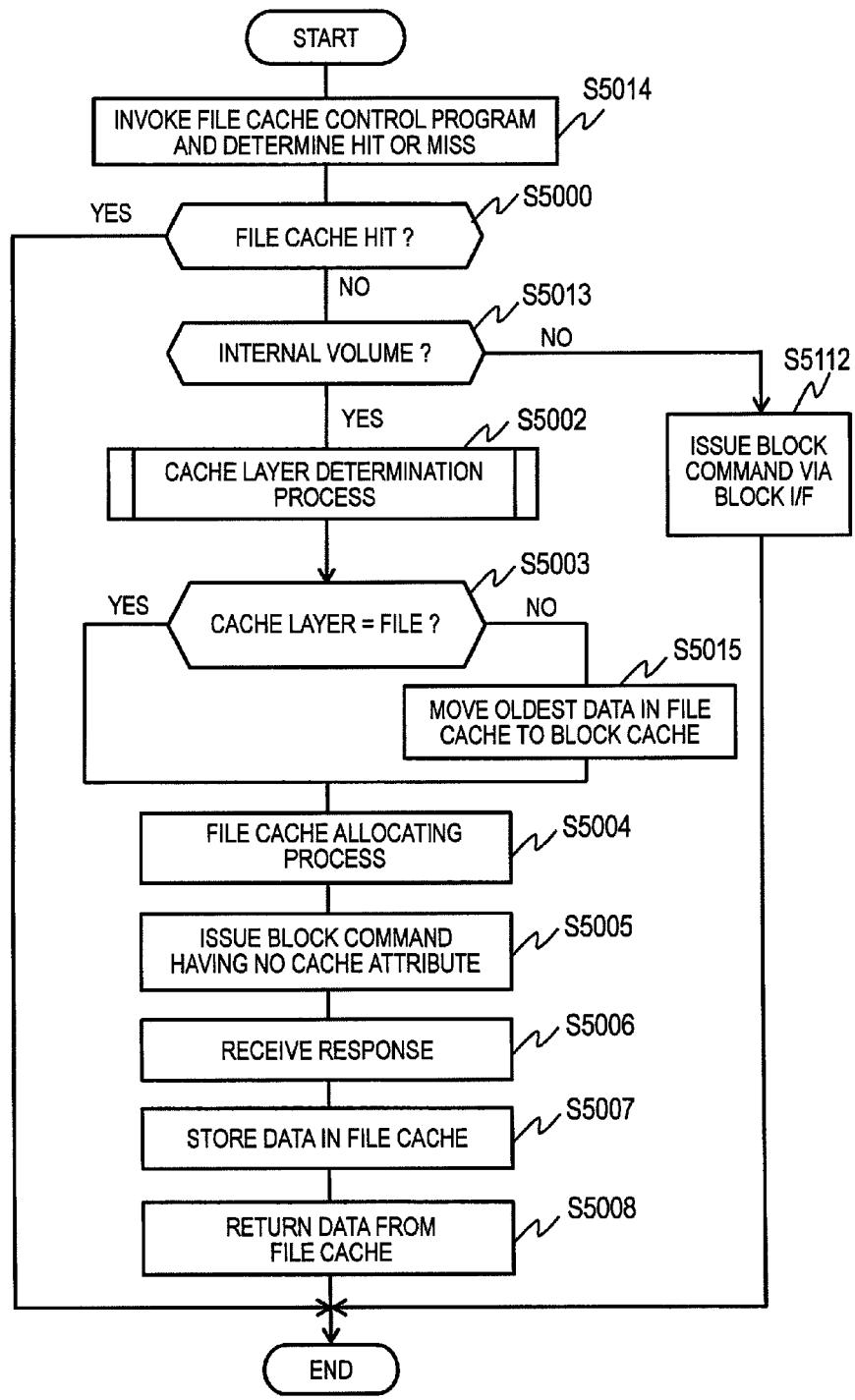
FIG. 11 illustrates a third exemplary process flow of issuing a read command by the block command issuing program in Example 1.

FIG. 11 is a third exemplary process flow of issuing a read command by the block command issuing program 203. The differences from the process flow of FIG. 10 are that, in place of Steps S5009 to S5011, Step S5015 is added if the result of the determination at Step S5003 is negative (the cache layer=block) and that Steps S5004 to S5008 are executed regardless of the result of the determination at Step S5003.

At Step S5015, the oldest data (the data having the earliest last access time) in the file cache area is moved to the block cache area 302. Specifically, the block command issuing program 203 communicates with the block cache control program 302 via the communication area 402 and issues an instruction to cache the particular block in the block cache area 320. After executing this step, the block command issuing program 203 proceeds to Step S5004. This step allows managing across the file cache area 220 and the block cache area 320.

Figure 12:
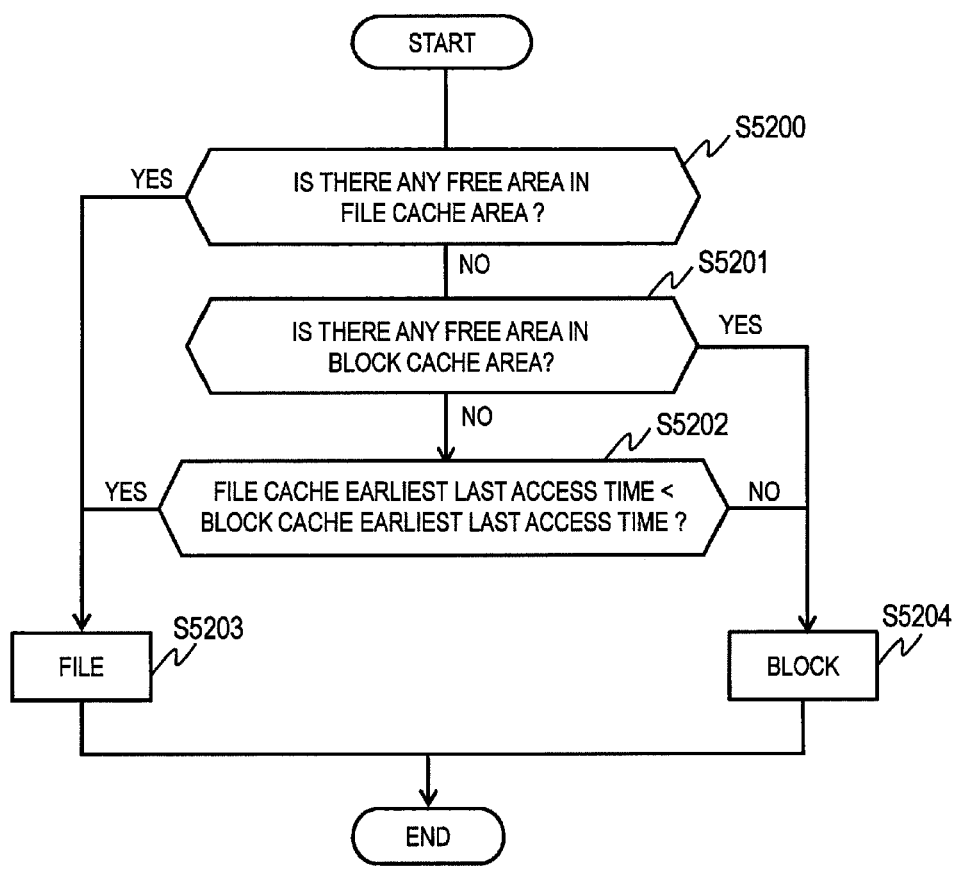
FIG. 12 is a flowchart illustrating an exemplary process of cache layer determination by the file cache control program in Example 1.

FIG. 12 is a flowchart illustrating an exemplary process of cache layer determination by the file cache control program 202. This process determines whether to use the file cache area 220 or the block cache area 320. In other words, it is a process of choosing the area (layer) from which to allocate a free area by discarding a part of the existing cache data to newly cache data.

First, the file cache control program 202 refers to the cache cooperation table 403 for the file cache free area field 4036 to determine whether any free area exists in the file cache area 320 (the value in the file cache free area field 4036 is not 0) (Step S5200). If a free area exists (YES at Step S5200), the file cache control program 202 returns "file cache area" as the result of the determination (Step S5203). File-based caching is more space-efficient than block-based caching and provides shorter response time because the file cache area 220 is closer to the NAS host 3 than the block cache area 320.

If no free area exists (NO at Step S5200), the file cache control program 202 refers to the cache cooperation table 403 for the block cache free area field 4037 to determine whether any free area exists in the block cache area 320 (the value in the block cache free area field 4037 is not 0) (Step S5201). If a free area exists (YES at Step S5201), the file cache control program 202 returns "block cache area" as the result of the determination (Step S5204). This result means that data can be cached without creating a new free area.

Neither areas have a free area (NO at Step S5201), the file cache control program 202 refers to the cache cooperation table 403 for the file cache earliest last access time field 4030 and the block cache earliest last access time field 4032 to compare the last access times of the oldest data in the file cache area 220 and the block cache area 320, and chooses the older one (Step S5202 to S5204).

In other words, if the last access time of the oldest data in the file cache area 220 is earlier than the last access time of the oldest data in the block cache area 320 (YES at Step S5202), the file cache control program 202 chooses the file cache area 220 (Step S5203). If the result is contrary or the last access times are the same (NO at Step S5202), the file cache control program 202 chooses the block cache area 320 (Step S5203). In the case of the same last access time, either cache area can be chosen.

In the meanwhile, there is an optional way of comparing the average last access times instead of the last access times of the oldest data. At Step 5202 in the option, the file cache control program 202 refers to the cache cooperation table 403 for the file cache average last access time field 4034 and the block cache average last access time field 4035 to compare the average last access times of the file cache area 220 and the block cache area 320.

Through this process, the data to be released from the cache data can be chosen from both of the file cache area 220 and the block cache area 320, so that a higher cache hit rate can be attained.

Figure 13:
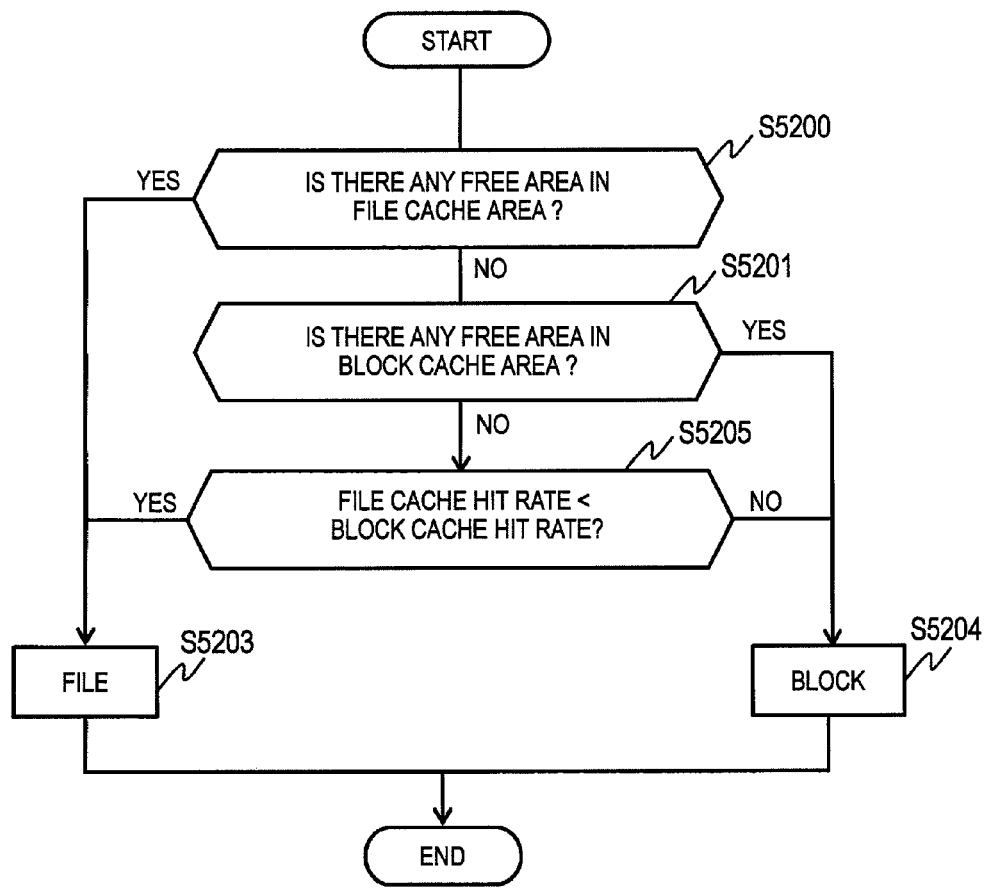
FIG. 13 illustrates another exemplary process of cache layer determination in Example 1.

FIG. 13 illustrates another exemplary process of cache layer determination. This process is the same as the cache layer determination illustrated in FIG. 12, except that Step S5202 has been replaced by Step S5205. At Step S5205, the file cache control program 202 refers to the cache cooperation table 403 for the file cache hit rate field 4031 and the block cache hit rate field 4033 to compare the cache hit rates of the file cache area 220 and the block cache area 320, and chooses the one having the lower hit rate (Steps S5205, S5203, and S5204).

In other words, if the block cache hit rate is higher than the file cache hit rate (YES at Step S5205), the file cache control program 202 chooses the file cache area 220 (Step S5203). If the result is contrary or the cache hit rates are the same (NO at Step S5205), the file cache control program 202 chooses the block cache area 320 (Step S5203). In the case of the same cache hit rate, either cache area can be chosen.

Through this process, the data to be released from the cache data can be selected from both of the file cache area 220 and the block cache area 320, so that a higher cache hit rate can be attained.

Figure 14:
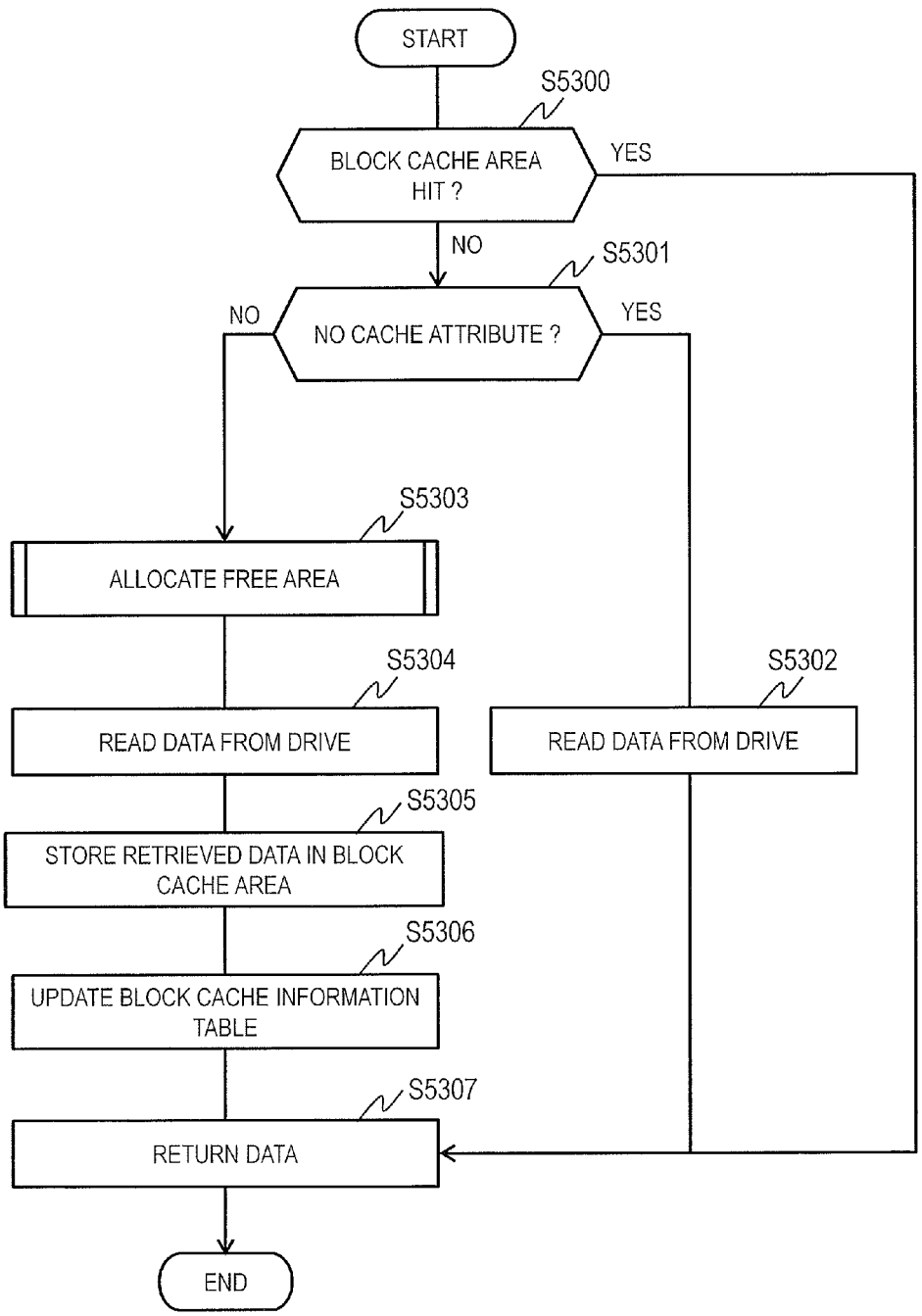
FIG. 14 illustrates an exemplary process flow of processing a block read command by a block command processing program in Example 1.

FIG. 14 illustrates an exemplary process flow of processing a block read command by the block command processing program 301. This process is executed upon receipt of a block command for a read. The block command processing program 301 is invoked with designation of the logical volume to be read and the logical address in the volume. The block command issued via the communication area 402 by the block command issuing program 203 of the file processing program may be accompanied by attribute information on caching operation in the read or the data, such as the NO CACHE attribute or the HIGH-PRIORITY RELEASE attribute.

The block command processing program 301 first invokes the block cache control program 302 and determines whether the object data is held in the block cache area 320 (hit/miss determination) (Step S5300). The block cache control program 302 can check whether the object data is held in the block cache area 320, with reference to the block cache information table 311.

In the case of a cache hit (YES at Step S5300), the block cache control program 302 returns the data to the command originator and updates the block cache information table 311 (Step S5307).

In the case of a cache miss (NO at Step S5300), the block command processing program 301 determines whether the command has designation of the NO CACHE attribute (Step S5301). If the NO CACHE attribute is designated (YES at Step S5301), the block command processing program 301 retrieves the data from the storage drives 109 (Step S5302) and returns the data to the command originator without storing it in the block cache area 320 (Step S5307).

If the NO CACHE attribute is not designated (NO at S5301), the block command processing program 301 invokes a later-described block cache free area allocating process in the block cache control program 302 and allocates a free area in the block cache area 320 (Step S5303).

The block command processing program 301 invokes the block cache control program 302, retrieves the data from the storage drives 109 (Step S5304), stores the retrieved data in the block cache area 320 (Step S5305), updates the block cache information table 311 (Step S5306), and returns the data to the command originator (Step S5307).

Figure 15:
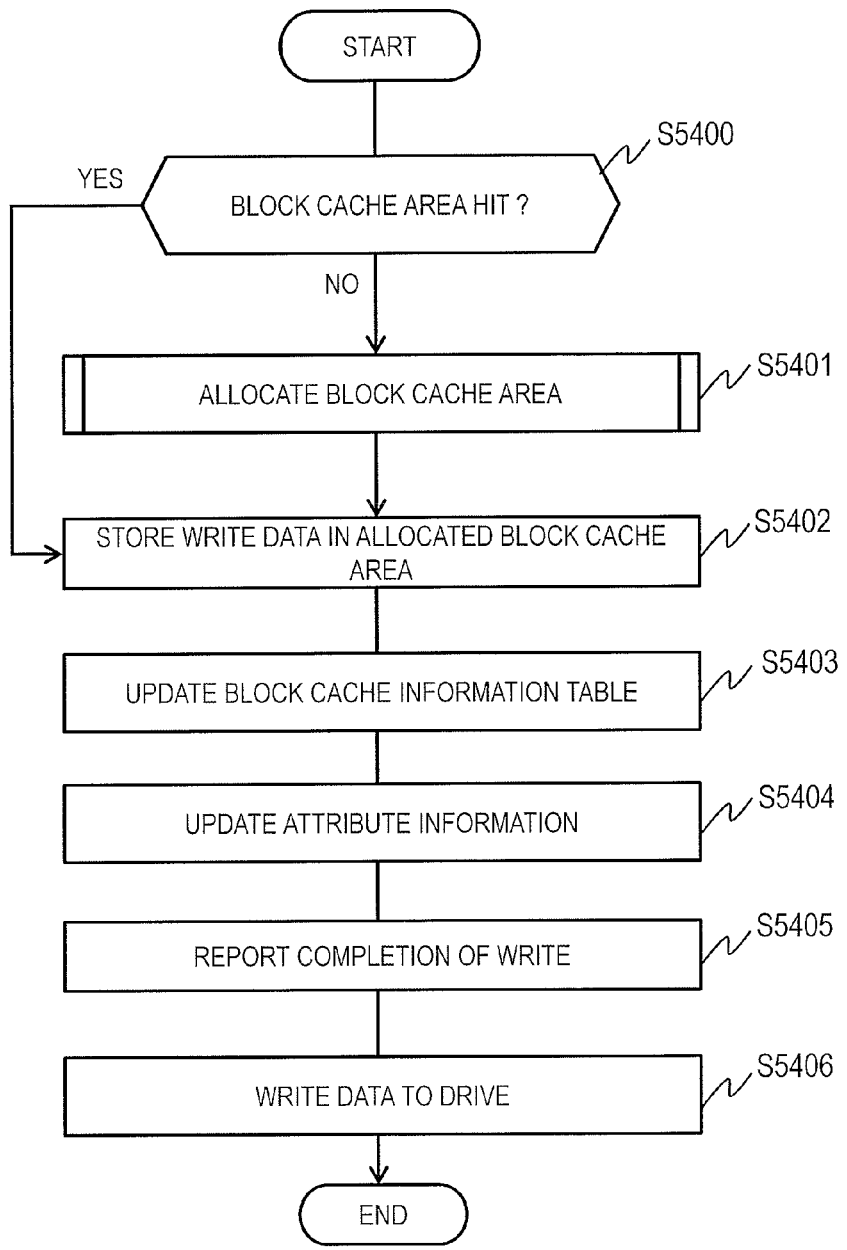
FIG. 15 illustrates an exemplary process flow of processing a block write command by the block command processing program in Example 1.

FIG. 15 illustrates an exemplary process flow of processing a block write command by the block command processing program 301. This process is executed upon receipt of a block command for a write. The block command processing program 301 is invoked with designation of the logical volume to be written and the logical address in the volume. The write command may be accompanied by attribute information, like a read command.

The block command processing program 301 first invokes the block cache control program 302 and performs hit/miss determination on the block cache with reference to the block cache information table 311 (Step S5400). In the case of a cache miss (NO at Step S5400), the block command processing program 301 invokes the later-described block cache free area allocating process in the block cache control program 302, allocates a free area, and allocates the free area for the data (Step S5401).

In the case of a cache hit (YES at Step S5400), the block command processing program 301 skips this step to proceed to the next Step S5402. The block command processing program 301 invokes the block cache control program 302, writes the write data to the allocated area (Step S5402), and updates the block cache information table 311 (Step S5403). If attribute information has been attached, the block cache control program 302 includes this information in the block cache information table 311 (Step S5404).

The block cache control program 302 returns a report of completion of write to the command originator (Step S5405); thereafter, the block cache control program 302 invoked by the block command processing program 301 writes the data to the storage drives 109 (Step S5406). As to the timing of execution, this Step S5406 is not necessarily performed immediate after the completion report, but may be performed in a batch for a plurality of commands. As a result, efficient write to the drives can be achieved.

Figure 16:
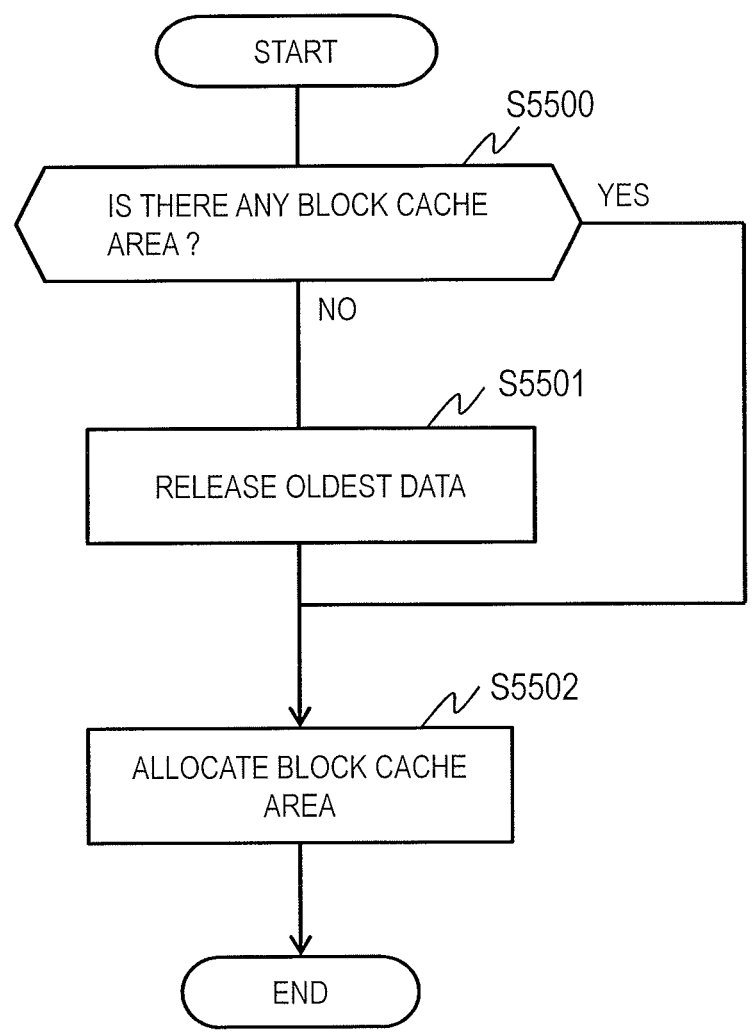
FIG. 16 illustrates an exemplary process flow of allocating a free area in the block cache area (a block cache free area allocating process) by a block cache control program in Example 1.

FIG. 16 illustrates an exemplary process flow of allocating a free area in the block cache area 320 (a block cache free area allocating process) by the block cache control program 302.

The block cache control program 302 determines whether a free area for storing the object data exists with reference to the block cache information table 311 (Step S5500), and if such an area exists (YES at Step S5500), the program 302 allocates the area (Step S5502) and ends. If such an area does not exist (NO at Step S5500), the block cache control program 302 releases an area (Step S5501), for example by deleting the oldest data (having the earliest last access time), to allocate the area (Step S5502).

Figure 17:
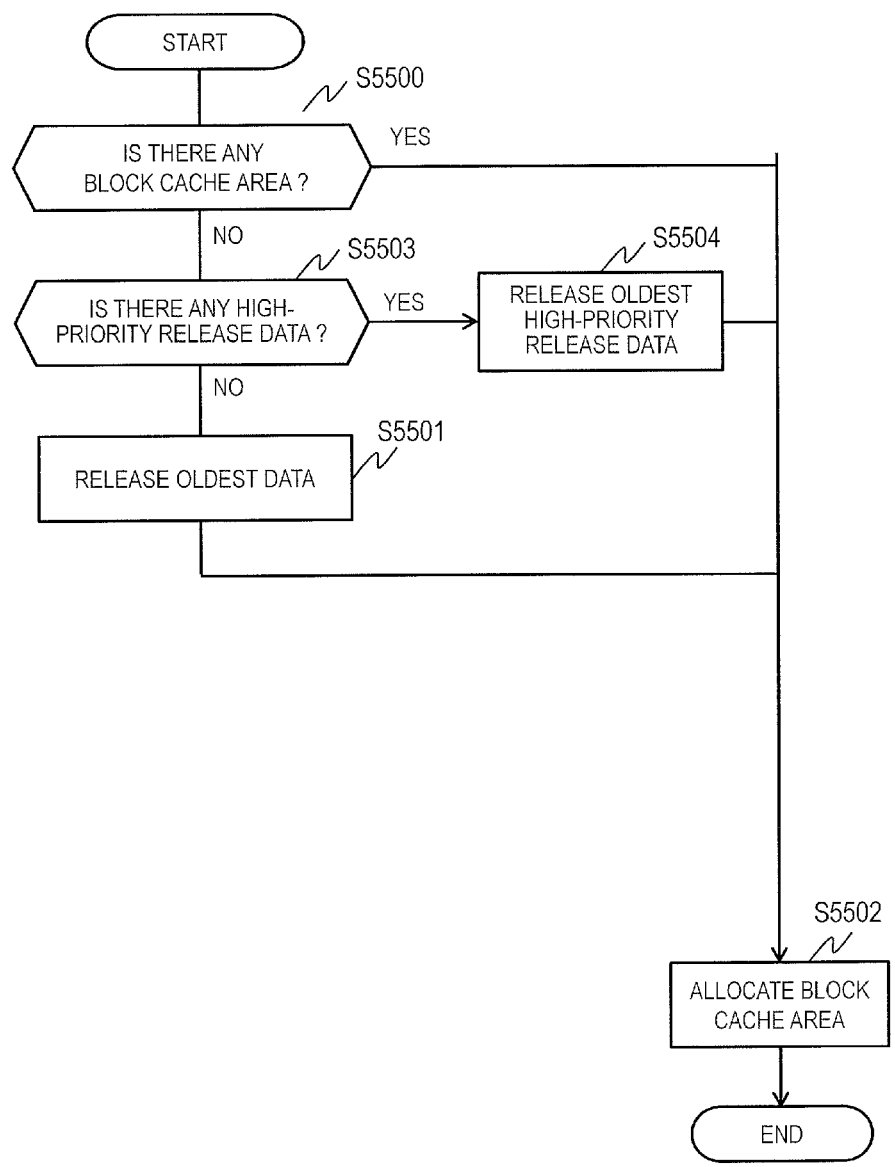
FIG. 17 illustrates a second exemplary process flow of the block cache free area allocating process by the block cache control program in Example 1.

FIG. 17 illustrates a second exemplary process flow of the block cache free area allocating process by the block cache control program 302. The difference from FIG. 16 is that Steps S5503 and S5504 are added between Steps S5500 and S5501.

At Step S5503, the block cache control program 302 determines whether data assigned the HIGH-PRIORITY RELEASE attribute exists with reference to the block cache information table 311. If such data exists (YES at Step S5503), the block cache control program 302 deletes the oldest piece of data (having the earliest last access time) from the data (Step S5504). If such data does not exist (NO at Step S5503), the block cache control program proceeds to Step S5501.

This example provides cooperation of two cache controls for files and blocks to achieve space-efficient cache control. Specifically, cooperation in cache control by the block processing program and the file processing program prevents the same data from being doubly cached, so that higher cache space efficiency is achieved.

In the case where the block processing program and the file processing program individually perform cache control, this example can select appropriate cache data to be replaced from the cache data of the block processing program and the cache data of the file processing program. This achieves high cache space efficiency to improve the performance, like in the case where the cache control is performed in accordance with a specific algorithm for the overall storage apparatus.

An example described above caches data in the file cache area 220 and does not cache the data in the block cache area 320. Another example described above, after storing the data in the block cache area 320, purges the data or preferentially discards the data by the block cache control using cache information. In the normal block cache control, the CTL 100 may cache at least a part of the data already in the file cache area 220 into the block cache area 320, like the data of a block command from an external.

EXAMPLE 2

This example chooses the caching depending on whether the originator host of a block command is an internal host (the file processing program) or an external host (the SAN host 3). FIG. 18 is an exemplary configuration of the block cache information table 311 in this example. The only difference from the block cache information table 311 of Example 1 shown in FIG. 7 is that the table 311 in this example includes an accessing host field 3115.

The accessing host field 3115 stores information to identify whether the host accessing the data is an internal host or an external host. For example, the information is a text of INTERNAL or EXTERNAL. If a plurality of internal/external hosts exist, numbers to individually identify them may be additionally included. Hereinafter, in the case where the accessing host field 3115 contains a text of INTERNAL, the attribute of the data is called internal attribute; in the case where the accessing host field 3115 contains a text of EXTERNAL, the attribute of the data is called external attribute.

Figure 19:
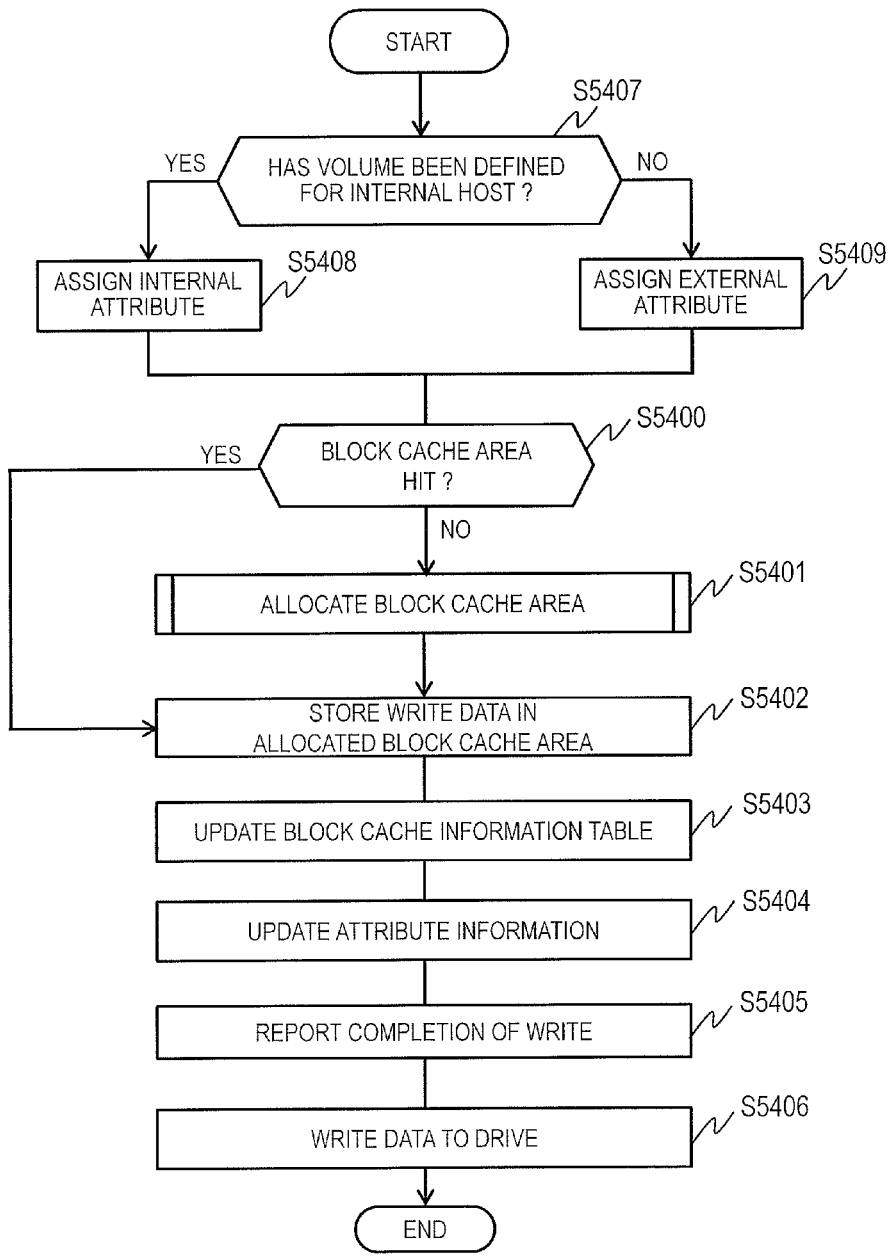
FIG. 19 illustrates an exemplary process flow of processing a block write command in Example 2.

FIG. 19 illustrates an exemplary process flow of processing a block write command in this example. The only difference from FIG. 15 is addition of Steps S5407 to S5409. Before the cache hit/miss determination at Step S5400, the block cache control program 302 invoked by the block command processing program 301 determines whether the volume has been defined for an internal host (Step S5407). For example, not-shown volume information table has this information.

If the result of the determination is positive (YES at Step S5407), the block cache control program 302 assigns the internal attribute to the cache data (Step S5408). If the result of the determination is negative (NO at Step S5407), the block cache control program 302 assigns the external attribute (Step S5409).

Specifically, the block cache control program 302 stores a text either INTERNAL or EXTERNAL, or a text additionally inclusive of a number to identify the host in a plurality of hosts in the accessing host field 3115 of the block cache information table 311.

In an alternative way to identify an internal host or external host, the block command issuing program 203 may attach information indicating an internal host to a write command to issue. Like the foregoing attribute information of cache data, an identifier indicating the accessing host may be included in the command itself or advised via another area in the communication area 402.

Figure 20:
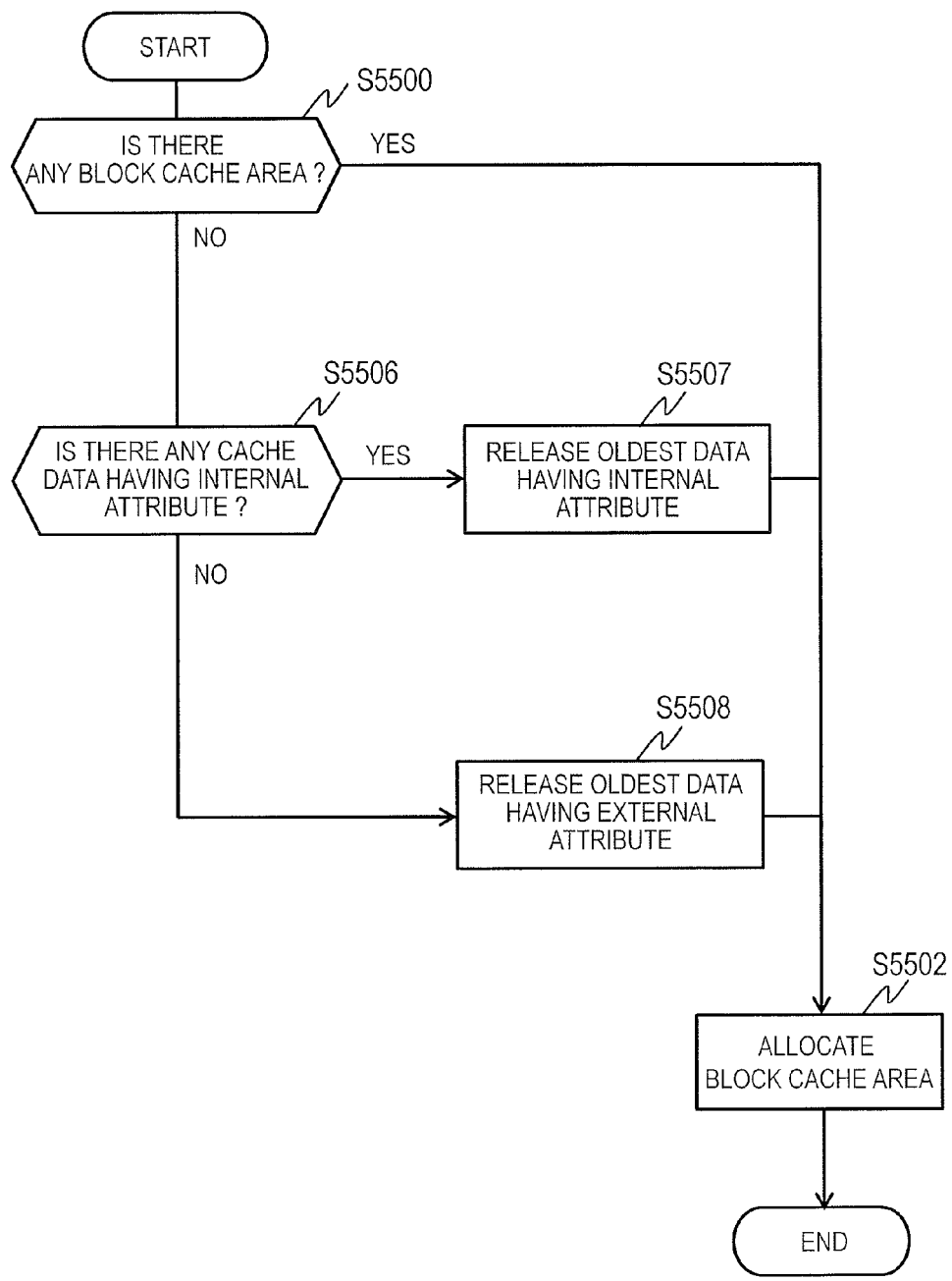
FIG. 20 illustrates an exemplary process flow of the block cache free area allocating process in Example 2.

FIG. 20 illustrates an exemplary process flow of allocating a block cache free area in this example. The difference from FIG. 16 is that Step S5501 has been replaced by Steps S5506, S5507, and S5508. First, at Step S5506, the block cache control program 302 determines whether the cache data having the internal attribute exists in the block cache area 320, with reference to the block cache information table 311.

If the cache data having the internal attribute exists (YES at Step S5506), the block cache control program 302 releases the oldest data (having the earliest last access time) in the cache data having the internal attribute (Step S5507) and allocates a free area (Step S5502). If no cache data having the internal attribute exists (NO at Step S5506), the block cache control program 302 releases the oldest data in the data having the external attribute (Step S5508).

Through this modification, data having the internal attribute is preferentially released from the block cache area 320. Unlike the data of the external host, the data of the internal host is also cached in the file cache area 220; for this reason, the LRU algorithm applied to the block cache area 320 leads the data of the external host to occupy relatively less cache area. This modification has an effect to prevent this problem.

Figure 21:
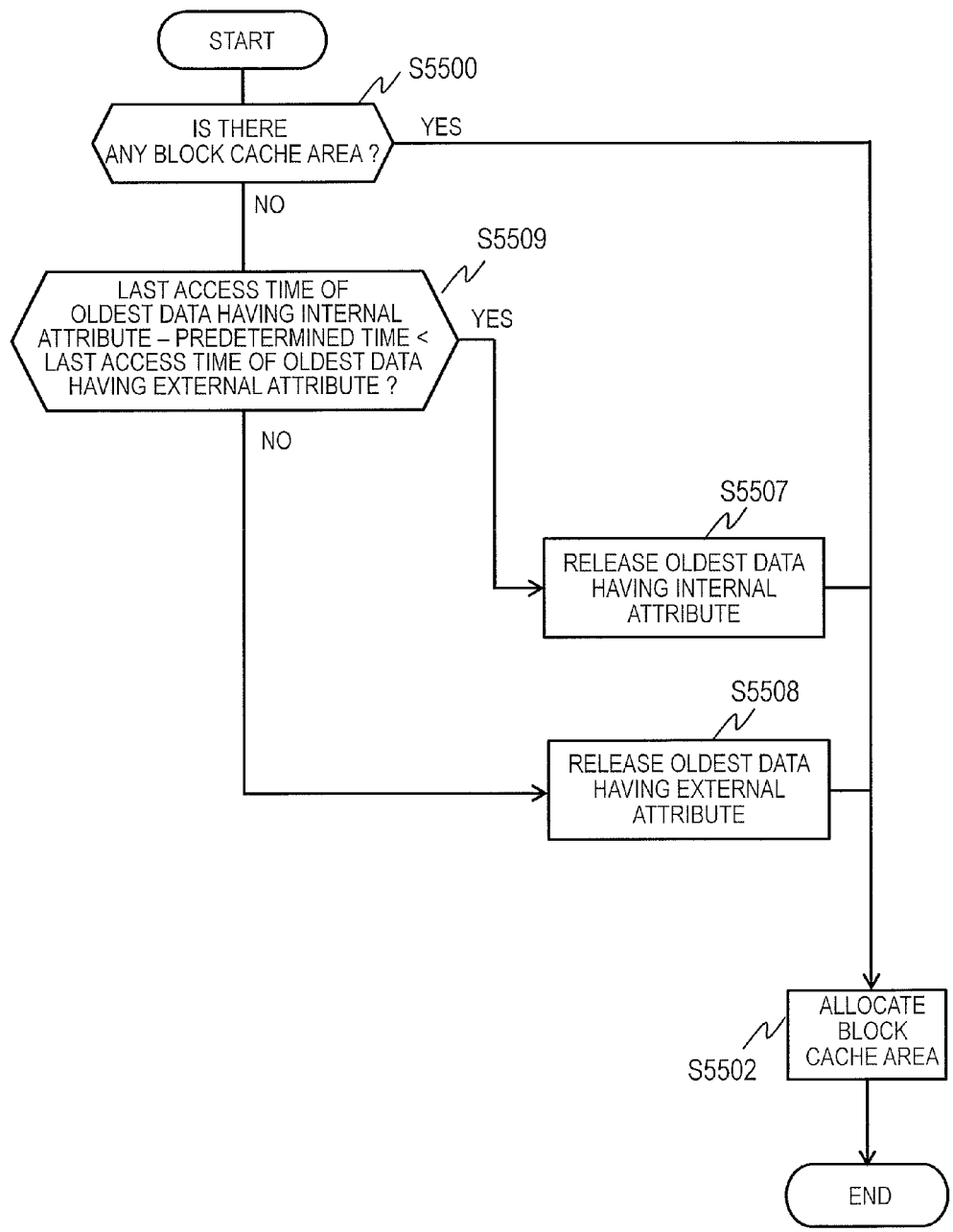
FIG. 21 illustrates another exemplary process flow of the block cache free area allocating process in Example 2.

FIG. 21 illustrates another exemplary process flow of allocating a block cache free area. Compared with FIG. 20, the difference is that Step S5506 has been replaced by Step S5509. At Step S5509, the block cache control program 302 refers to the block cache information table 311 and compares a value obtained by deducting a predetermined value from the last access time of the oldest data having the internal attribute with the last access time of the oldest data having the external attribute.

If the last access time of the oldest data having the external attribute is greater (later) (YES at Step S5509), the block cache control program 302 proceeds to Step S5507. If the last access time of the oldest data having the external attribute is smaller (earlier) (NO at Step S5509), the block cache control program 302 proceeds to Step S5508. In this example, if they are the same value, the block cache control program 302 proceeds to Step S5508, but it may be configured to proceed to either step.

Although the method of FIG. 20 preferentially releases data having the internal attribute without exception, this method provides stricter LRU management since it takes the access time into account.

Figure 22:
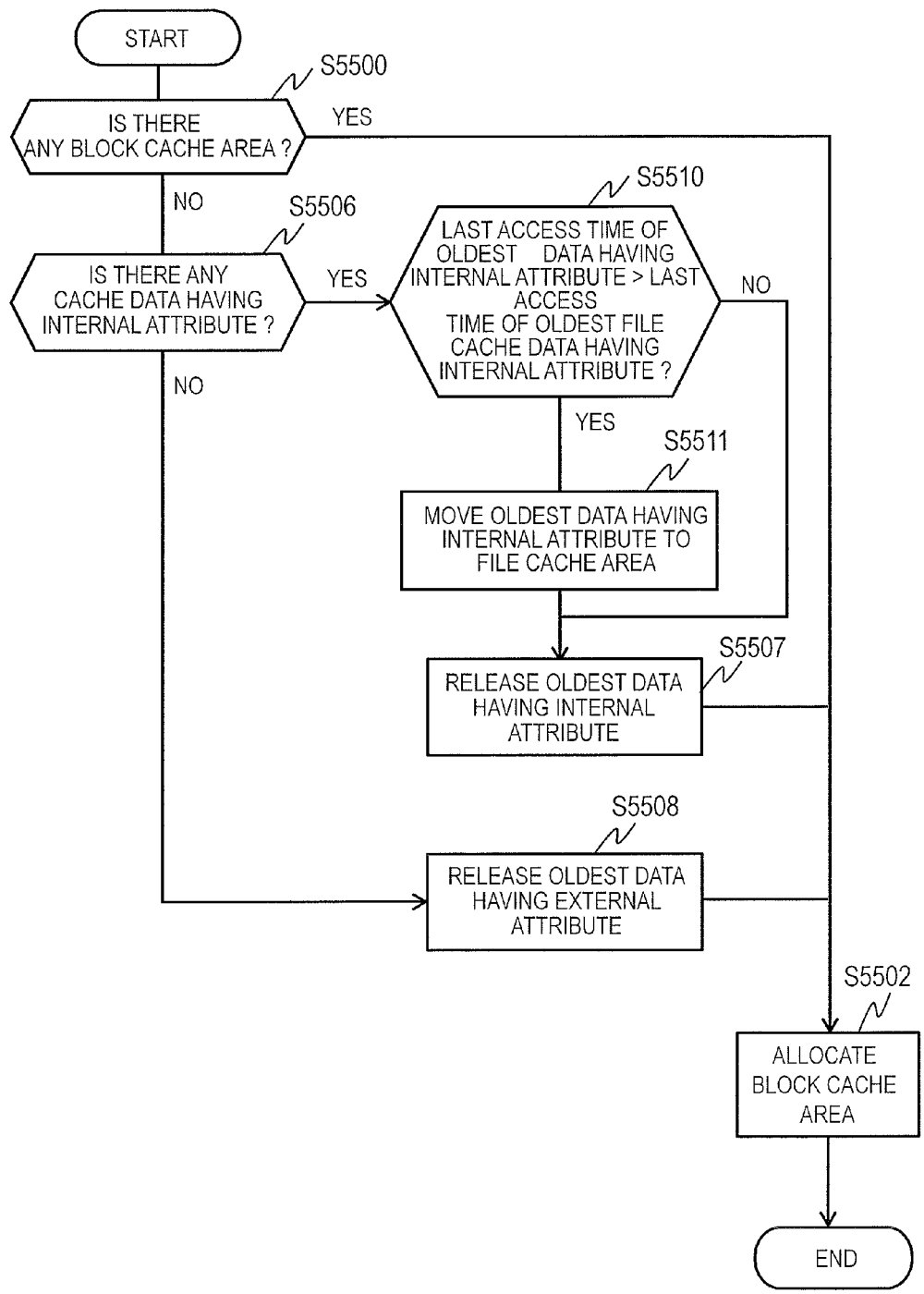
FIG. 22 illustrates yet another exemplary process flow of the block cache free area allocating process in Example 2.

FIG. 22 illustrates yet another exemplary process flow of allocating a block cache free area. Compared with FIG. 20, the difference is that Steps S5510 and S5511 have been added between Steps S5506 and S5507.

At Step S5510, the block cache control program 302 compares the last access times between the oldest data having the internal attribute in the block cache area 320 and the oldest data having the internal attribute in the file cache area 220 in the same internal host.

Although not shown in the drawing, the file cache information table 211 includes an accessing host field indicating the accessing host of the entry, like the block cache information table 311 shown in FIG. 18. The block cache control program 302 can acquire information on the oldest block cache data having the internal attribute from the block cache information table 311 and information on the oldest file cache data in the same internal host from the file cache information table 211.

As a result of the comparison, if the oldest data of the cache data in the file cache area is older (YES at Step S5510), the block cache control program 302 moves the oldest data having the internal attribute in the block cache area 320 to the file cache area 220 (Step S5511) and proceeds to Step S5507.

If a plurality of internal hosts exist, the block cache control program 302 identifies the internal hosts with the internal host numbers in the accessing host field 3115 in the block cache information table 311 and performs the foregoing process on the individual file cache areas (file cache data) for the internal hosts.

Through this process, pieces of data in the individual file cache areas used by the internal hosts are replaced by data in the block cache area in accordance with the access times; thus, a well-balanced cache replacement order between the internal hosts and the external hosts can be provided.

It should be noted that the difference in FIG. 22 is also effective if the original drawing is assumed to be FIG. 21, instead of FIG. 20, namely, if Step S5506 has been replaced by Step S5509. In this example, the block processing program is reported by the file processing program that the data belongs to an internal host. Consequently, the cache data of the external host is not unnecessarily pressurized and efficient cache control for the overall system can be achieved.

This example manages information indicating accessing hosts in caching by the block processing program, so that the data to be preferentially in the cache can be retained in the cache area. As described with reference to FIGS. 20 to 22, discarding data of the internal host prior to data of the external host can increase the cache usage efficiency in the storage apparatus 4.

The block cache free area allocating processes in this example can be applied to the storage apparatuses having the configurations in the other examples and further, aside from the configurations of the other examples, can be applied to storage apparatuses, for example, a storage apparatus which does not perform cache control inclusive of cache layer determination.

EXAMPLE 3

Figure 23:
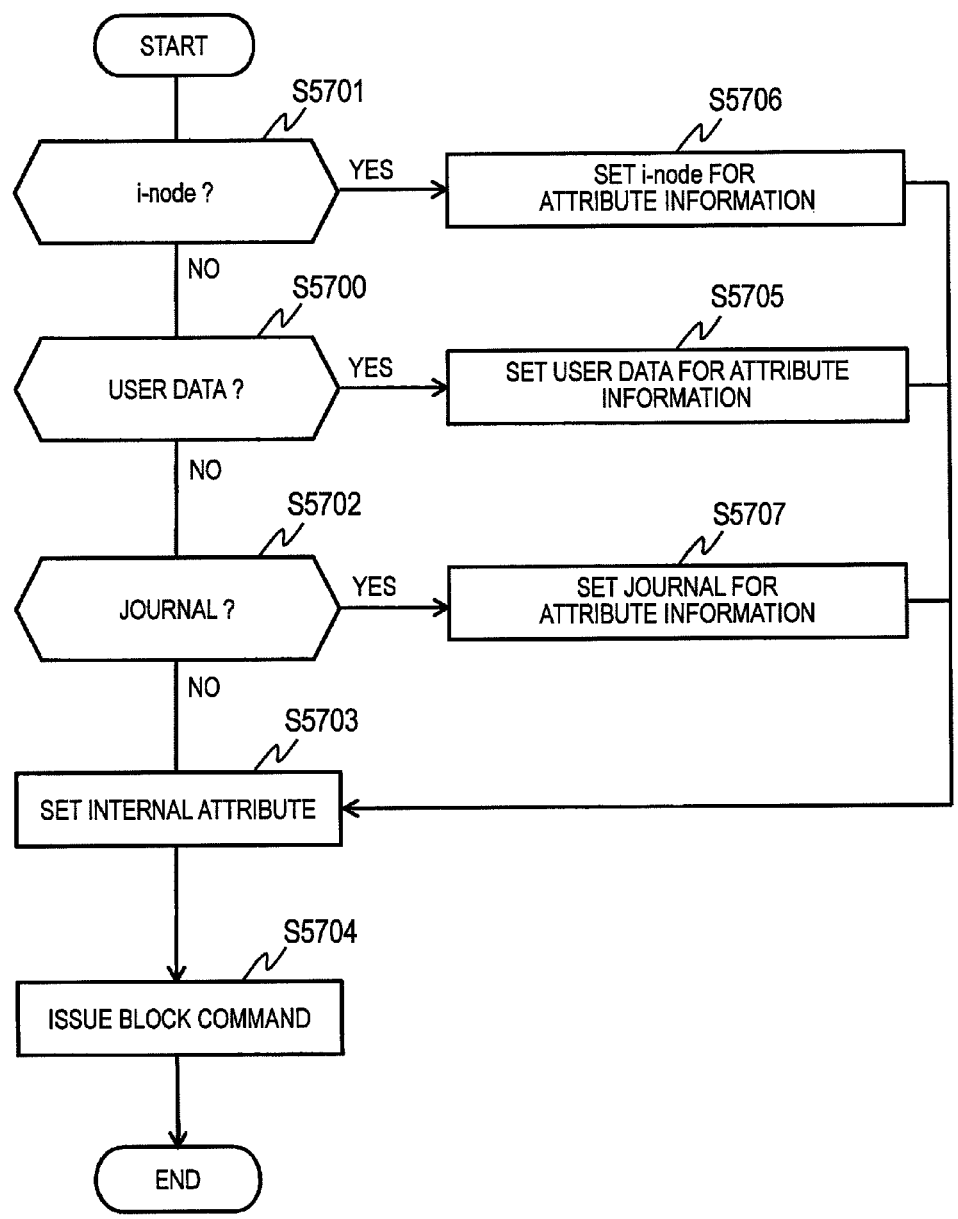
FIG. 23 illustrates an exemplary process flow of issuing a write command by the block command issuing program in Example 3.

This example provides changing the priority level in releasing data of an internal host cached in the block cache area 320 in accordance with the attribute information. FIG. 23 illustrates an exemplary process flow of issuing a write command by the block command issuing program 203.

First, the block command issuing program 203 determines whether the data is i-node (Step S5701); second, it determines whether the data is user data (Step S5700); and third, it determines whether the data is journal data (Step S5702). If the result of each determination is YES, the block command issuing program 203 proceeds to Step S5705, S5706, or S5707.

For example, not-shown volume information table has information to associate a volume and an address in the volume with the attribute of the data (any one kind of i-node, user data, and journal data). With reference to the volume information table, the block command issuing program 203 can determine the attribute of the object data from the volume and the address in the volume of the object data.

The block command issuing program 203 sets USER DATA in the attribute information field of the block command at Step S5705, sets i-node at Step S5706, and JOURNAL at Step S5707. Furthermore, the block command issuing program 203 sets the internal attribute for the accessing host information (Step S5703) and issues a block command (Step S5704).

The block cache information table 311 stores the value indicating which attribute the entry has, i-node, user data, or journal data, in the attribute information field 3113.

Depending on the block size or the structure of the file system, one block may include i-node and user data together, or user data and journal data together. This example performs determinations in accordance with the priority level of caching, namely, in order of i-node, which is most likely to be requested to be retained in the cache, user data, and lastly journal data, which is least likely to be referred to again. Consequently, if at least a part of the data is data having a higher priority level, the data is given priority. This invention is not limited to this method. For example, the block command issuing program 203 may set a plurality of attributes such as "USER DATA, i-node" in the attribute information field of the block command.

Figure 24:
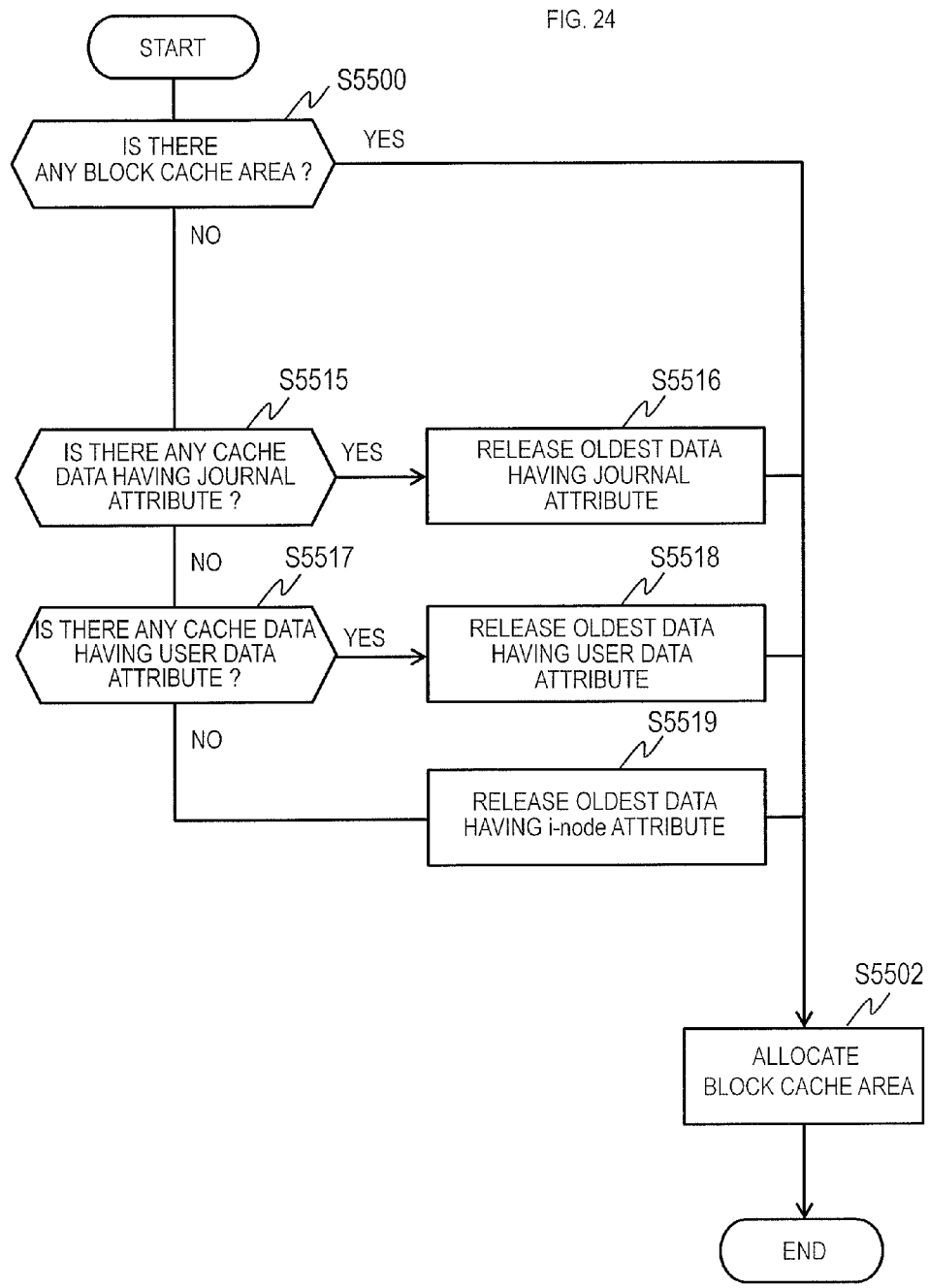
FIG. 24 illustrates an exemplary process flow of the block cache free area allocating process in Example 3.

FIG. 24 illustrates an exemplary process of allocating a block cache free area in this example. The difference from FIG. 16 is that Step S5501 has been replaced by Steps 5515 to S5519.

First, the block cache control program 302 refers to the block cache information table 311 and determines whether cache data (entry) having the attribute information (the value in the attribute information field 3113) of JOURNAL exists (Step S5515). If such data exists (YES at Step S5515), the program 302 releases the oldest data having the JOURNAL attribute (Step S5516).

If such data does not exist (NO at Step S5515), the block cache control program 302 whether cache data (entry) having the USER DATA attribute exists (Step S5517). If such data exists (YES at S5517), the program 302 releases the oldest data having the USER DATA attribute (Step S5518). If such data does not exist either (NO at S5517), the block cache control program 302 releases data having the i-node attribute (S5519).

This example manages the kinds of information for the file processing program in the cache for the block processing program, so that information to be preferentially in the cache can be retained in the cache. In particular, i-node, which is more likely to be referred to again and has great effect of remaining in the cache, is preferentially retained in the cache and conversely, data having the journal attribute, which is less likely to be referred to again, is preferentially released. This configuration increases the cache usage efficiency in the system.

The block cache free area allocating process in this example can be applied to the storage apparatuses having the configurations in the other examples and, aside from the configurations of the other examples, can be applied to storage apparatuses.

EXAMPLE 4

Figure 25:
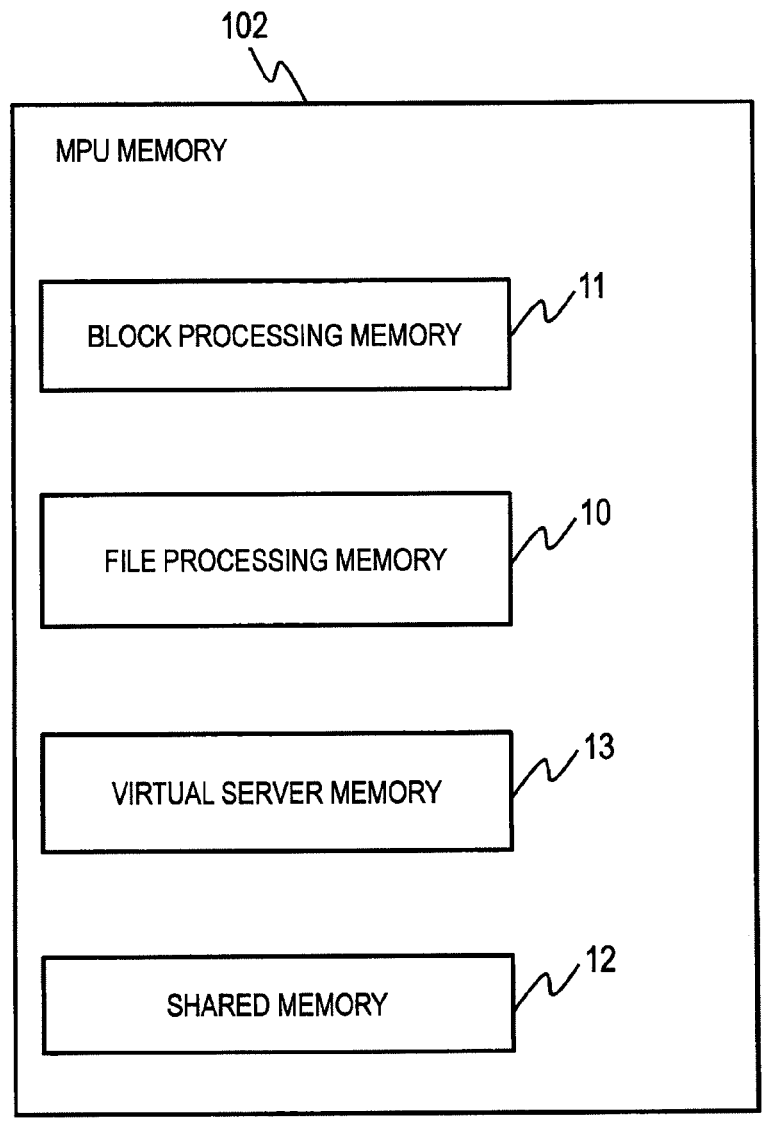
FIG. 25 illustrates an exemplary configuration of an MPU memory in Example 4.
Figure 26:
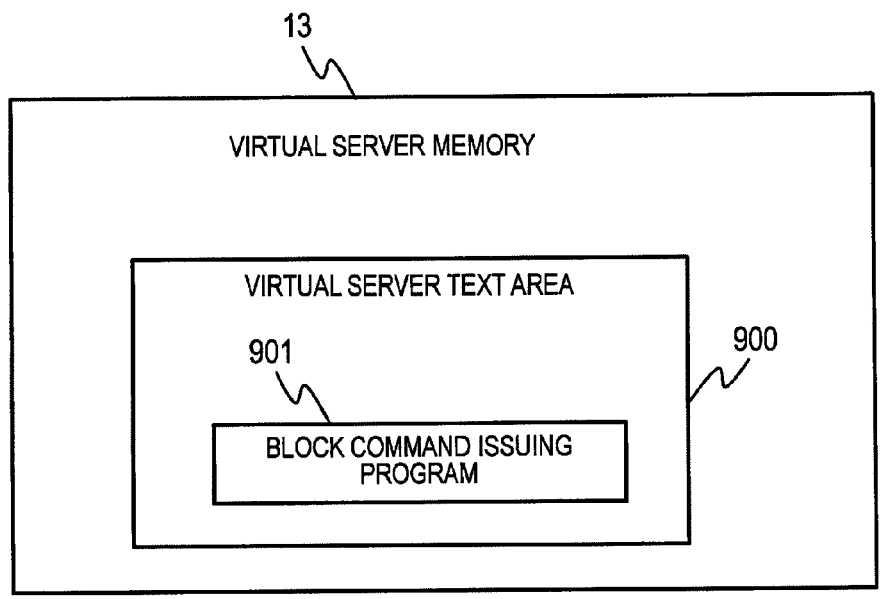
FIG. 26 illustrates an exemplary configuration of a virtual server memory in Example 4.

This example provides a configuration for a virtual server to share the same MPU and MPU memory with the block processing program and the file processing program in operation. FIG. 25 illustrates an exemplary memory configuration in this example. This configuration includes a virtual server memory 13 in addition to the configuration of FIG. 2. FIG. 26 is an exemplary configuration of the virtual server memory 13, which has a virtual server text area 900 including a block command issuing program 901.

Typically, a virtual server is configured because a user wants to operate some application. The storage apparatus may have a logical volume including the data accessed by this application.

In such a case, the virtual server can be treated as an internal host, like the file processing program in Examples 1, 2, or 3. That is to say, the block processing program assigns the INTERNAL attribute for the accessing host information on the stored data, based on the target of definition of the volume or the attached information of the block command, as described in Example 2.

In this assignment, the virtual server is distinguished from the file processing program. Although this example provides one virtual server, the number of virtual servers may be plural. In the case of a plurality of virtual servers, information indicating a virtual server and a number, such as INTERNAL SERVER1, may be assigned to distinguish the virtual server from the others. As to the releasing order of the cache considering internal/external, the same as Example 3 applies.

EXAMPLE 5

Figure 27:
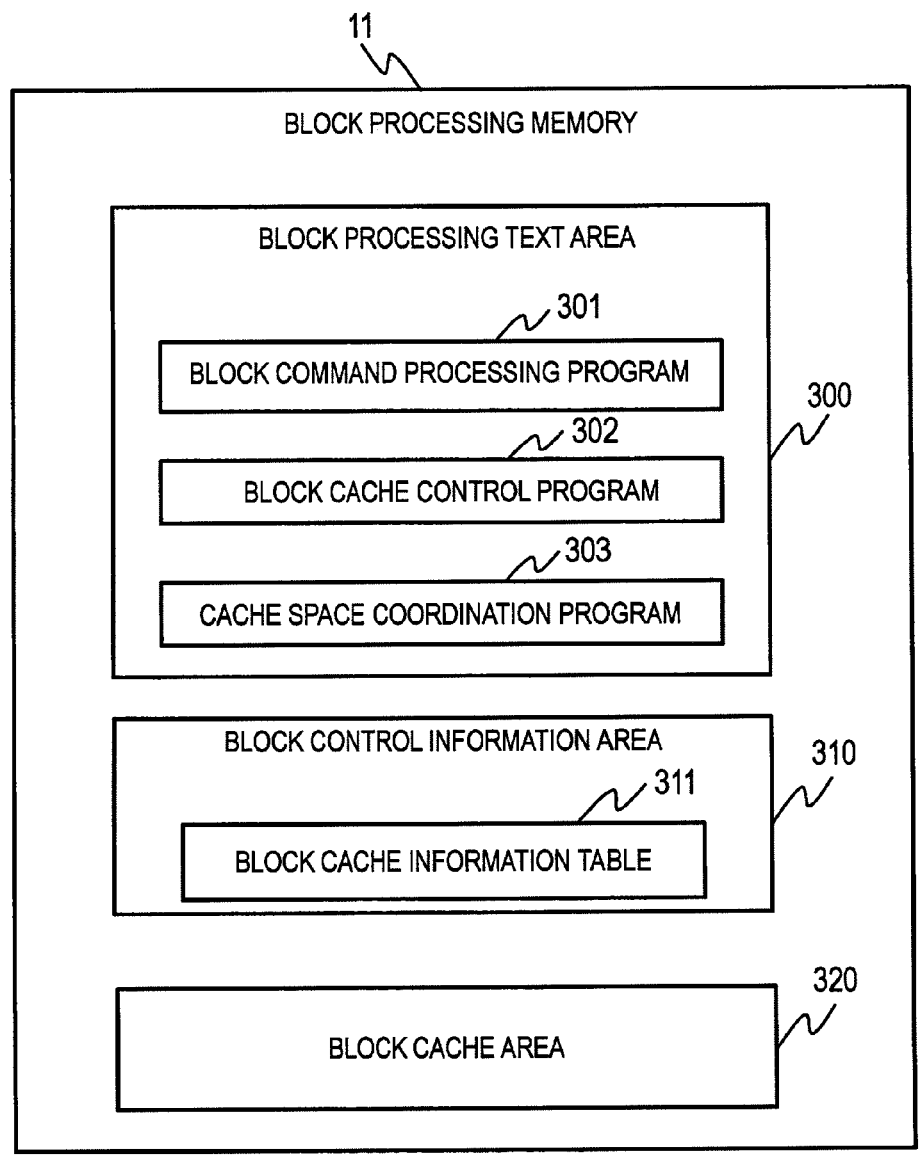
FIG. 27 illustrates an exemplary configuration of a block processing memory in Example 5.

FIG. 27 is an exemplary configuration of the block processing memory 11 in this example. The difference from FIG. 3 is that a block-file cache space coordination program 303 is added to the block processing text area 300. The cache space coordination program 303 is periodically executed to coordinate the balance between the file cache area 220 and the block cache area 320. This program provides appropriate control of the cache space for the both areas to increase the hit rate.

Figure 28:
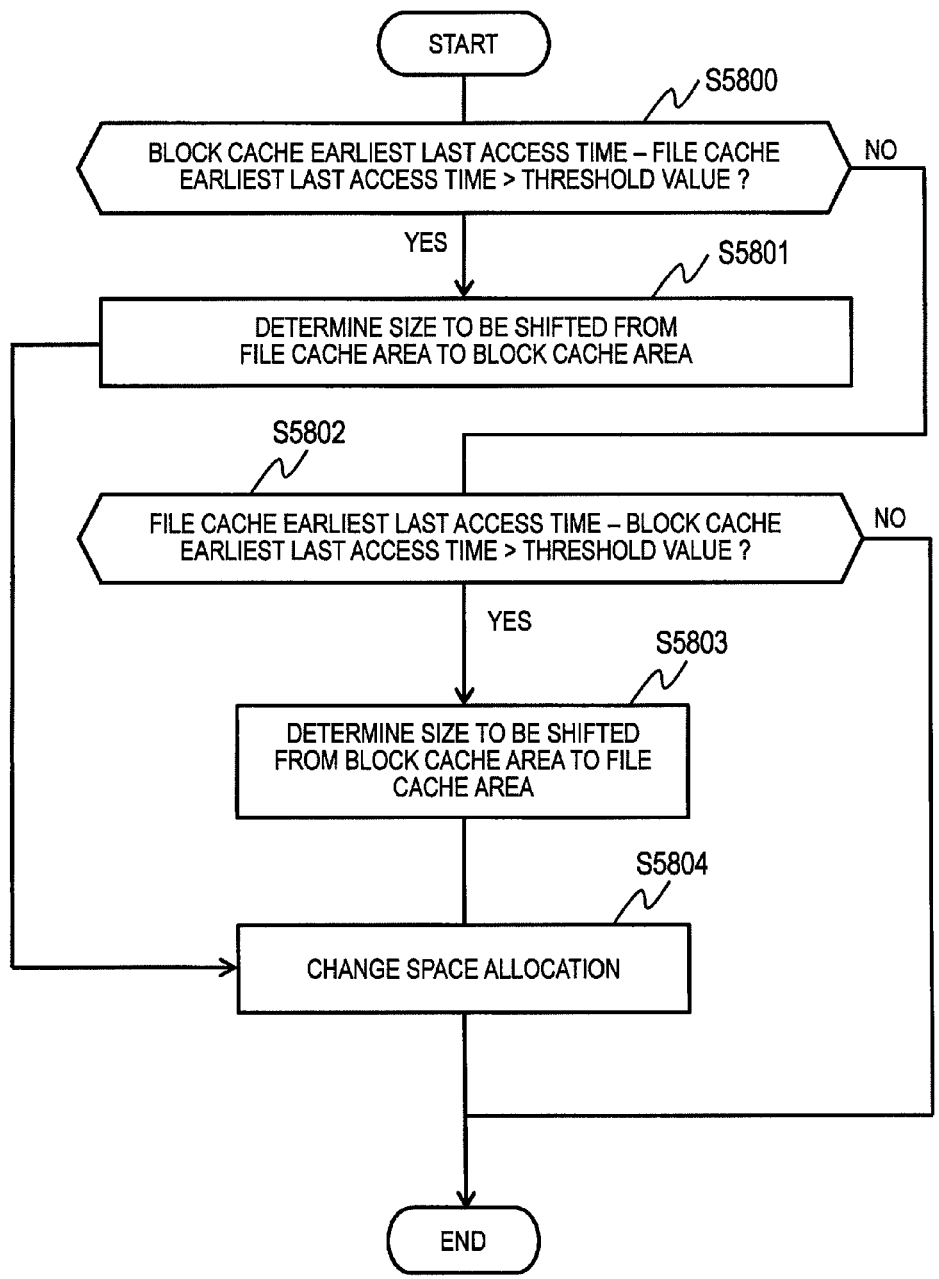
FIG. 28 illustrates an exemplary process flow of changing space allocation by a cache space coordination program in Example 5.

FIG. 28 is an exemplary process flow of changing space allocation by the cache space coordination program 303.

First, the cache space coordination program 303 determines whether the difference obtained by deducting the file cache earliest last access time from the block cache earliest last access time is greater than a predetermined threshold value (Step S5800). Specifically, the cache space coordination program 303 performs the determination by referring to the cache cooperation information table 403 for file cache earliest last access time field 4030 and the block cache earliest last access time field 4032.

If the result of the determination at Step S5800 is YES, the cache space coordination program 303 determines the size of the space to be shifted from the file cache area 220 to the block cache area 320 (Step S5801). For example, the size to be shifted may be a fixed size or a size calculated by multiplying the difference between the earliest last access times by a given coefficient.

If the result of the determination at Step S5800 is NO, the cache space coordination program 303 determines whether the difference obtained by deducting the block cache earliest last access time from the file cache earliest last access time is greater than a predetermined threshold value (Step S5802).

If the result of the determination at Step S5802 is YES, the cache space coordination program 303 determines the size of the space to be shifted from the block cache area 320 to the file cache area 220 (Step S5803). If the result of the determination at Step S5802 is NO, the cache space coordination program 303 terminates its processing. After the determination of the size to be shifted at Step S5801 or S5803, the cache space coordination program 303 proceeds to Step S5804 and changes the space allocation.

To change the space allocation, for example to shift a part of the file cache area 220 to the block cache area 320, the cache space coordination program 303 allocates free areas in the size to be shifted in the file cache area 220 by the free area allocating process by the file cache control program 202 and adds them to the block cache area 320.

Some management method of the file processing memory 10 and the block processing memory 11 may not allow the change of the allocation only by specific size of continuous space units. In such a case, relocate the cache data in the cache area so that the allocated free areas will be physically continuous areas (which is equivalent to exchange the free areas with areas holding cache data) to obtain a unit size enough to allow the change of the allocation.

The block cache free area allocating process in this example can be applied to the storage apparatuses having the configurations in the other examples and further, aside from the configurations of the other examples, can be applied to storage apparatuses.

As set forth above, the embodiments of this invention have been described; however, this invention is not limited to the foregoing embodiments. Those skilled in the art can easily modify, add, or convert each element in the foregoing embodiments within the scope of this invention. A part of the configuration of some example can be replaced with that of a different example; otherwise, a configuration of an example can be added to the configuration of a different example.

The above-described configurations, functions, processing modules, and means for processing, for all or a part of them, may be implemented by hardware: for example, by designing integrated circuits. The information of programs, tables, and files to implement the functions may be stored in a storage device such as a non-volatile semi-conductor memory, a hard disk drive, or an SSD (Solid State Drive), or a computer-readable non-transitory data storage medium such as an IC card, an SD card, or a DVD.

The invention claimed is:

1. A storage apparatus for receiving block I/O commands and file I/O commands, the storage apparatus comprising:
a plurality of storage devices for storing data of block I/O commands and file I/O commands; and
a controller including a block cache area and a file cache area,
wherein the controller creates block I/O commands from file I/O commands and accesses the plurality of storage devices in accordance with the created block I/O commands;
wherein the file cache area caches data of file I/O commands;
wherein the block cache area caches data of block I/O commands;
wherein, in a case where the file cache area is lacking an area to cache first data of a received first file I/O command, the controller chooses one of a first cache method that newly creates a free area in the file cache area to cache the first data in the file cache area and a second cache method that caches the first data in the block cache area without caching the first data in the file cache area.

2. The storage apparatus according to claim 1, wherein the controller chooses the second cache method in a case where a free area in the block cache area can cache the first data.

3. The storage apparatus according to claim 1,
wherein the controller refers to access time information on data held in the file cache area and access time information on data held in the block cache area;
wherein the controller chooses the first cache method in a case where the access time information on the file cache area indicates an access time earlier than the access time information on the block cache area; and
wherein the controller chooses the second cache method in a case where the access time information on the block cache area indicates an access time earlier than the access time information on the file cache area.

4. The storage apparatus according to claim 3, wherein the access time information is either one of an earliest last access time and an average value of last access times in each of the file cache area and the block cache area.

5. The storage apparatus according to claim 1, wherein the controller caches the first data in the file cache area without caching the first data in the block cache area in the first cache method.

6. The storage apparatus according to claim 1, wherein, after storing the first data in the block cache area, the controller discards the first data from the block cache area with a highest priority of discarding in the first cache method.

7. The storage apparatus according to claim 6, wherein, in the discarding the first data from the block cache area with the highest priority of discarding, the controller purges the first data after storing the first data in the block cache area or assigns the highest priority of discarding to the first data in the management information for the block cache area.

8. The storage apparatus according to claim 1, wherein the controller includes data indicating a cache control method for the first data in the block I/O command created from the first file I/O command.

9. The storage apparatus according to claim 1, wherein the controller discards data of block I/O commands converted from file I/O commands from the block cache area prior to data of block I/O commands received from an external.

10. The storage apparatus according to claim 1, wherein the controller manages kinds of data of the block I/O commands converted from the file I/O commands and determines priority levels of discarding from the block cache area depending on the kinds of data.

11. The storage apparatus according to claim 1, wherein the controller shifts a cache area between the file cache area and the block cache area.

12. A control method for a storage apparatus for receiving block I/O commands and file I/O commands, the control method comprising the steps of:
   creating a block I/O command from a file I/O command and accessing a storage device in accordance with the created block I/O command;
   caching data of file I/O commands in a file cache area;
   caching data of block I/O commands in a block cache area; and
   choosing, in a case where the file cache area is lacking an area to cache first data of a received first file I/O command, one of a first cache method that newly creates a free area in the file cache area to cache the first data in the file cache area and a second cache method that caches the first data in the block cache area without caching the first data in the file cache area.

13. The control method for the storage apparatus according to claim 12, wherein, in a case where a free area in the block cache area can cache the first data, the choosing step chooses the second cache method.

14. The control method for the storage apparatus according to claim 12, wherein the choosing step comprises:
   referring to access time information on data held in the file cache area and access time information on data held in the block cache area;
   choosing the first cache method in a case where the access time information on the file cache area indicates an access time earlier than the access time information on the block cache area; and
   choosing the second cache method in a case where the access time information on the block cache area indicates an access time earlier than the access time information on the file cache area.

15. The A control method for the storage apparatus according to claim 12, wherein the first cache method caches the first data in the file cache area without caching the first data in the block cache area.

* * * * *